US008294939B2

(12) United States Patent
Fujimori et al.

(10) Patent No.: US 8,294,939 B2
(45) Date of Patent: Oct. 23, 2012

(54) PRINT MANAGEMENT METHOD AND APPARATUS WITH MULTIPLE VIEWS

(75) Inventors: Toshiro Fujimori, Laguna Beach, CA (US); Geoff W. Harmon, Mission Viejo, CA (US); Rakesh Pandit, Irvine, CA (US); Shigenori Matsubara, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 12/729,818

(22) Filed: Mar. 23, 2010

(65) Prior Publication Data

US 2010/0188700 A1 Jul. 29, 2010

Related U.S. Application Data

(62) Division of application No. 11/395,584, filed on Mar. 31, 2006.

(51) Int. Cl.
*G06F 15/00* (2006.01)
(52) U.S. Cl. .................... 358/1.15; 358/1.1; 358/1.9
(58) Field of Classification Search .................. 358/1.1, 358/1.15, 1.11, 1.9
See application file for complete search history.

(56) References Cited

U.S. PATENT DOCUMENTS

| | | | |
|---|---|---|---|
| 5,559,933 A | 9/1996 | Boswell | |
| 5,580,177 A | 12/1996 | Gase et al. | |
| 5,727,135 A | 3/1998 | Webb et al. | |
| 6,498,656 B1 | 12/2002 | Mastie et al. | |
| 6,667,810 B1 | 12/2003 | Jeyachandran et al. | |
| 6,762,852 B1 | 7/2004 | Fischer | |
| 6,930,795 B1 | 8/2005 | Motamed et al. | |
| 6,962,449 B2 | 11/2005 | Lermant et al. | |
| 6,974,269 B2 | 12/2005 | Lermant et al. | |
| 2002/0026379 A1* | 2/2002 | Chiarabini et al. | 705/26 |
| 2002/0042797 A1 | 4/2002 | Kimura | |
| 2002/0135792 A1 | 9/2002 | Sommer et al. | |
| 2002/0196460 A1* | 12/2002 | Parry | 358/1.15 |

(Continued)

FOREIGN PATENT DOCUMENTS

JP 09-305337 11/1997

(Continued)

OTHER PUBLICATIONS

Japanese Office Action, dated Apr. 3, 2012, in related Japanese patent application, No. JP 2007-090221.

(Continued)

*Primary Examiner* — King Poon
*Assistant Examiner* — Iriana Cruz
(74) *Attorney, Agent, or Firm* — Chen Yoshimura LLP

(57) ABSTRACT

A method for managing a plurality of print jobs is implemented in a print job management apparatus connected to printers. The method includes receiving print job, and visually presenting a display screen to a user, the display screen including first, second and third panels for classifying the received print jobs according to processing phase thereof, the first panel being provided for listing print jobs that are awaiting assignment of printers thereto for processing the print jobs, the second panel being provided for listing print jobs that have been assigned to printers and that have not been completed by the assigned printers, the third panel being provided for listing at least one of first and second categories of print jobs, the first category including print jobs that have been completed, the second category including print jobs that have been cancelled.

12 Claims, 13 Drawing Sheets

U.S. PATENT DOCUMENTS

| | | |
|---|---|---|
| 2003/0007819 A1 | 1/2003 | Wanda |
| 2003/0011812 A1 | 1/2003 | Sesek et al. |
| 2003/0103235 A1 | 6/2003 | Gomi |
| 2004/0105122 A1 | 6/2004 | Schaeffer |
| 2004/0136030 A1* | 7/2004 | Gassho ............... 358/1.15 |
| 2004/0145768 A1 | 7/2004 | Stringham |
| 2004/0145772 A1 | 7/2004 | Stringham |
| 2004/0196482 A1 | 10/2004 | Kurita |
| 2005/0162667 A1 | 7/2005 | Felix et al. |
| 2006/0031585 A1* | 2/2006 | Nielsen et al. ............ 709/246 |
| 2006/0114497 A1 | 6/2006 | Anderson et al. |
| 2007/0103719 A1 | 5/2007 | Azuchi |

FOREIGN PATENT DOCUMENTS

| | | |
|---|---|---|
| JP | 10-187400 | 7/1998 |
| JP | 10-320341 | 12/1998 |
| JP | 10-320342 | 12/1998 |
| JP | 1999-095940 | 4/1999 |
| JP | 11-277852 | 10/1999 |
| JP | 2000-010741 | 1/2000 |
| JP | 2000-242453 | 9/2000 |
| JP | 2000-293465 | 10/2000 |
| JP | 2001-075768 | 3/2001 |
| JP | 2001-256013 | 9/2001 |
| JP | 2002-171378 | 6/2002 |
| JP | 2002-278710 | 9/2002 |
| JP | 2003-162351 | 6/2003 |
| JP | 2003-251898 | 9/2003 |
| JP | 2003-266882 | 9/2003 |
| JP | 2003-316535 | 11/2003 |
| JP | 2004-213393 | 7/2004 |

OTHER PUBLICATIONS

Japanese Office Action, dated Aug. 30, 2011, in related Japanese patent application, No. JP 2007-090224.

Japanese Office Action, dated Aug. 30, 2011, in related Japanese patent application, No. JP 2007-090221.

Japanese Office Action, dated Aug. 30, 2011, in related Japanese patent application, No. JP 2007-090233.

* cited by examiner

| Queues Panel (4 Printers, 2 Clusters, 2 Hot Folders) | | | | ☒ |
|---|---|---|---|---|
| Tray ▲ | Paper Size | Paper Type | Color | |
| ⊟ Printers | | | | |
| ⊟ BW Printer 1 | | | | |
| ⊟ BW Printer 1: Mirage 1050(Status: Active, Jobs: 20, Wait Time: 3 mins) | | | | |
| Tray1 | 3.5" × 11" | Plain | ▯ | |
| Tray2 | 11" × 17" | Coated B | ▯ | |
| Tray3 | 5.5" × 3.5" | Fine | ▯ | |
| ⊟ BW Printer 2 | | | | |
| ⊟ BW Printer 2: Piccasso 920(Status: Error, Jobs: 0, Wait Time: 24 hours) | | | | |
| Tray1 | 3.5" × 11" | Plain | ▯ | |
| Tray2 | 11" × 17" | Plain | ▯ | |
| Tray3 | 11" × 17" | Plain | ▯ | |
| Tray4 | 3.5" × 11" | Book | ▯ | |
| ⊟ Color Printer 1 | | | | |
| ⊟ Color Printer 1: 8050(Status: Warning, Jobs: 10, Wait Time: 10 mins) | | | | |
| Tray1 | 3.5" × 11" | Book | ▯ | |
| ⊟ Color Printer 2 | | | | |
| ⊟ Color Printer 2: C500(Status: Active, Jobs: 15, Wait Time: 2 mins) | | | | |
| Tray1 | 5.5" × 3.5" | Plain | ▯ | |
| ⊟ Clusters | | | | |
| ⊟ Cluster 1 | | | | |
| ⊟ BW Printer 1: Mirage 1050(Status: Active, Jobs: 20, Wait Time: 3 mins) | | | | |
| Tray1 | 3.5" × 11" | Plain | ▯ | |
| Tray2 | 11" × 17" | Coated B | ▯ | |
| Tray3 | 5.5" × 3.5" | Fine | ▯ | |
| ⊟ Color Printer 2: C500(Status: Active, Jobs: 15, Wait Time: 2 mins) | | | | |
| Tray1 | 5.5" × 35" | Plain | ▯ | |
| ⊞ Cluster 2 | | | | |
| ⊟ Hot Folders | | | | |
| ⊟ Hot Folders 1 | | | | |
| ⊟ Color Printer 1: 8050(Status: Warning, Jobs: 10, Wait Time: 10 mins) | | | | |
| Tray1 | 3.5" × 11" | Coated A | ▯ | |
| ⊞ Hot Folders 2 | | | | |

FIG. 10

| View Recommends - Job Ticket #00003 | | | ☒ |
|---|---|---|---|
| Paper Size | Paper Type | | Color |
| ⊟ BW Printer 1 | | | |
| ⊟ BW Printer 1: Mirage 1050(Status: Active, Jobs: 20, Wait Time: 3 mins) | | | |
| 5.5" × 8.5" | Fine | | ▯ |
| 11" × 17" | Coated B | | ▯ |
| 8.5" × 11" | Plain | | ▯ |
| ⊟ BW Printer 2 | | | |
| ⊟ BW Printer 2: Piccasso 920(Status: Error, Jobs: 0, Wait Time: 24 hours) | | | |
| 11" × 17" | Plain | | ▯ |
| 8.5" × 11" | Book | | ▯ |
| 8.5" × 11" | Plain | | ▯ |
| 11" × 17" | Plain | | ▯ |

FIG. 11

| View Recommends - Job Ticket #00001 | | | ☒ |
|---|---|---|---|
| Paper Size | Paper Type | | Color |
| ⊟ Cluster 1 | | | |
| ⊟ BW Printer 1: Mirage 1050(Status: Active, Jobs: 20, Wait Time: 3 mins) | | | |
| 5.5" × 8.5" | Fine | | ▯ |
| 11" × 17" | Coated B | | ▯ |
| 8.5" × 11" | Plain | | ▯ |
| ⊞ Color Printer 2: C500(Status: Active, Jobs: 15, Wait Time: 2 mins) | | | |

PRINT MANAGEMENT METHOD AND APPARATUS WITH MULTIPLE VIEWS

This application is a divisional application under 35 USC §120 of U.S. patent application Ser. No. 11/395,584, filed Mar. 31, 2006, now pending, which is herein incorporated by reference in its entirety.

In addition, this application cross-references and incorporates by reference the following U.S. patent applications in their entireties: U.S. patent application Ser. No. 11/394,526, filed Mar. 31, 2006; U.S. patent application Ser. No. 11/395,520, filed Mar. 31, 2006; U.S. patent application Ser. No. 11/395,519, filed Mar. 31, 2006.

BACKGROUND OF THE INVENTION

1. Field of the Invention

This invention relates to print management method and apparatus, and more particularly, to printer management method and apparatus for managing a plurality of print jobs.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differ in terms of these job parameters, a print shop utilizes multiple commercial grade printers. Typically, one or more black & white (B&W) printers are in operation to process B&W printing. Color printers are also installed to handle color printing. Each of these printers, however, has limitations on available printer settings, such as the paper size, the paper type, resolution settings, etc. When a large volume of printing jobs is to be handled with multiple B&W and color printers, it is a daunting task to assign each printing job to an appropriate printer.

SUMMARY OF THE INVENTION

Accordingly, the present invention is directed to a print management method and apparatus that substantially obviates one or more of the problems due to limitations and disadvantages of the related art.

An object of the present invention is to provide an improved print management method and apparatus.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provide a method for managing a plurality of pint jobs, implemented in a print job management apparatus connected to printers, the method including receiving print jobs, and visually presenting a display screen to a user, the display screen including first, second and third panels for classifying the received print jobs according to processing phase thereof, the first panel being provided for listing print jobs that are awaiting assignment of printers thereto for processing the print jobs, the second panel being provided for listing print jobs that have been assigned to printers and that have not been completed by the assigned printers, the third panel being provided for listing at least one of first and second categories of print jobs, the first category including print jobs that have been completed, the second category including print jobs that have been cancelled.

In another aspect, the present invention provides a method for managing pint jobs, implemented in a print job management apparatus, the method including receiving print jobs, and providing a user with user selectable first and second display screens, the first display screen visually presenting to the user a plurality of panels classifying the print jobs according to processing phase of the print jobs, the second display screen visually presenting to the user a single panel that lists all of the print jobs.

In another aspect, the present invention provides a computer program product including a computer usable medium having a computer readable code embodied therein for controlling a data processing apparatus connected to printers, the data processing apparatus being connected to a display monitor, the computer readable program code being configured to cause the data processing apparatus to execute a process for managing a plurality of print jobs, the process including receiving print jobs, and causing a display monitor to visually present a display screen to a user, the display screen including first, second and third panels for classifying the received print jobs according to processing phase thereof, the first panel being provided for listing print jobs that are awaiting assignment of printers thereto for processing the print jobs, the second panel being provided for listing print jobs that have been assigned to printers and that have not been completed by the assigned printers, the third panel being provided for listing at least one of first and second categories of print jobs, the first category including print jobs that have been completed, the second category including print jobs that have been cancelled.

In another aspect, the present invention provides a computer program product including a computer usable medium having a computer readable code embodied therein for controlling a data processing apparatus connected to printers, the data processing apparatus being connected to a display monitor, the computer readable program code being configured to cause the data processing apparatus to execute a process for managing a plurality of print jobs, the process including receiving print jobs, and providing, through the display monitor, user selectable first and second display screens, the first display screen visually presenting to a user a plurality of panels classifying the print jobs according to processing phase of the print jobs, the second display screen visually presenting to the user a single panel that lists all of the print jobs.

In another aspect, the present invention provides a print management apparatus for managing a plurality of print jobs, including a display monitor; and a data processor for controlling the display monitor, the data processor being configured to receive print jobs, and causing the display monitor to visually present a display screen to a user, wherein the display screen includes first, second and third panels for classifying the received print jobs according to processing phase thereof, the first panel being provided for listing print jobs that are awaiting assignment of printers thereto for processing the print jobs, the second panel being provided for listing print jobs that have been assigned to printers and that have not been completed by the assigned printers, the third panel being provided for listing at least one of first and second categories of print jobs, the first category including print jobs that have been completed, the second category including print jobs that have been cancelled.

In another aspect, the present invention provides a print management apparatus for managing print jobs, including a display monitor, and a data processor for controlling the display monitor, the data processor being configured to receive print jobs, and providing, through the display monitor, user selectable first and second display screens, wherein the first display screen visually presents to a user a plurality of panels classifying the print jobs according to processing phase of the print jobs, and the second display screen visually presents to the user a single panel that lists all of the print jobs.

It is to be understood that both the foregoing general description and the following detailed description are exemplary and explanatory, and are intended to provide further explanation of the invention as claimed.

BRIEF DESCRIPTION OF THE DRAWINGS

FIG. 2 schematically illustrates a Main Screen that appears on a display of a print job management apparatus according to an embodiment of the present invention.

FIG. 6 schematically illustrates an In Box Panel screen according to an embodiment of the present invention.

FIG. 10 schematically illustrates an example of a Queue Panel for a specified print job according to an embodiment of the present invention.

FIG. 11 schematically illustrates an example of a View Recommends Panel according to an embodiment of the present invention.

FIG. 12 schematically illustrates another example of a View Recommends Panel according to an embodiment of the present invention.

FIG. 14 schematically illustrates an example of All Jobs Panel according to an embodiment of the present invention.

DETAILED DESCRIPTION OF THE PREFERRED EMBODIMENTS

Figure 1:
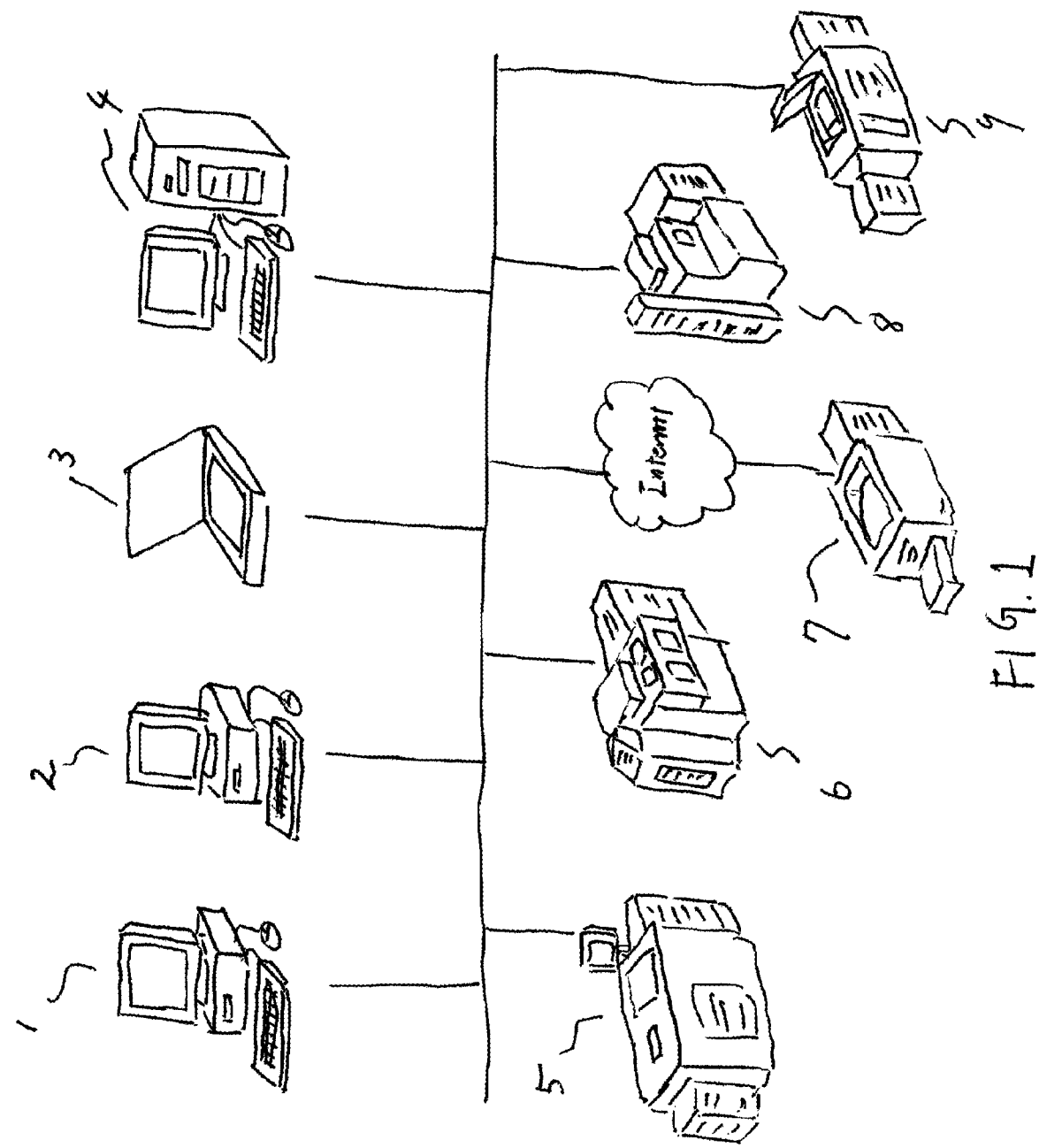
FIG. 1 schematically illustrates a print management system having multiple printers.

According to embodiments of the present invention, a large number of print jobs can be speedily and efficiently processed. FIG. 1 illustrates an example of a print management system in a print shop having multiple printers according to an embodiment of the present invention. Client computers 1 and 2 are connected to a server 4 via a local area network (LAN). Scanner 3 is also connected to server 4 via the LAN. In this example, B&W printers 5, 6, and 7 and color printers 8 and 9 are connected to the server through the LAN.

In this example, printers 5-9 are commercial standard high-end printers that can handle high speed, high quality printing. Each of the printers 5-9 has multiple paper trays to store paper of various sizes, color, and types. Further, some of the printers 5-9 are equipped with a sophisticated output sorting mechanism with multiple output trays to perform collate printing or other print finishing functions. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions.

In this embodiment, in addition to the server administrative software, print job management software is installed on server 4 for managing a large number of print jobs that come into a print shop. Once a print shop operator calls the print job management software, server 4 reads out the print job management software to a random access memory (RAM) of the server to carry out various functions of the software, including management of print jobs.

A print job is a print request specifying various desired options together with a document to be printed. For example, a customer may bring a floppy diskette containing a file in the PDF format for printing with a particular finishing option. The print shop operator asks the customer what kind of print jobs is desired to figure out print job parameters. Alternatively, the customer may be asked to fill out a questionnaire sheet to describe what print options he/she desires. For example, the customer may desire that the document be printed on 24 lb 25% cotton letter size paper in full color in the double-sided printing mode in the amount of 100 copies. The print shop operator then records these job parameter values along with customer information as a file and store the file and the source PDF file onto the hard disk drive or other secured storage device so that the print job parameters are associated with the file.

Print jobs also may be generated by a customer's requests to copy a document. When a customer brings a document for copying, the shop operator scans the document using scanner 3 (which may be a color and/or B&W scanner) and converts the document into a digital file and thereafter creates a data file associated with the scanned source document in a manner similar to above.

Theses data files representing print jobs and associated files are forwarded to server 4. This way, numerous print jobs are generated and collected by server 4 on which print job management software is running.

The print job management server 4 running print job management software receives the print job files and analyzes and processes the print jobs. The print job management software preferably is designed to run on Windows OS, Macintosh OS, or Unix X Windows or other popular computer operating systems implementing a GUI (graphic user interface), such as a touchscreen and/or a mouse and a keyboard, coupled with a display monitor. Server 4 (or any suitable data processing apparatus) running print job management software of embodiments of the present invention is hereinafter referred to as "print job management server." In this application, the terms "print job management server" and "print job management apparatus" broadly refer to any data processing apparatus that can implement various features of embodiments of the present invention described below with appropriate hardware/software.

Main Screen

Figure 2:
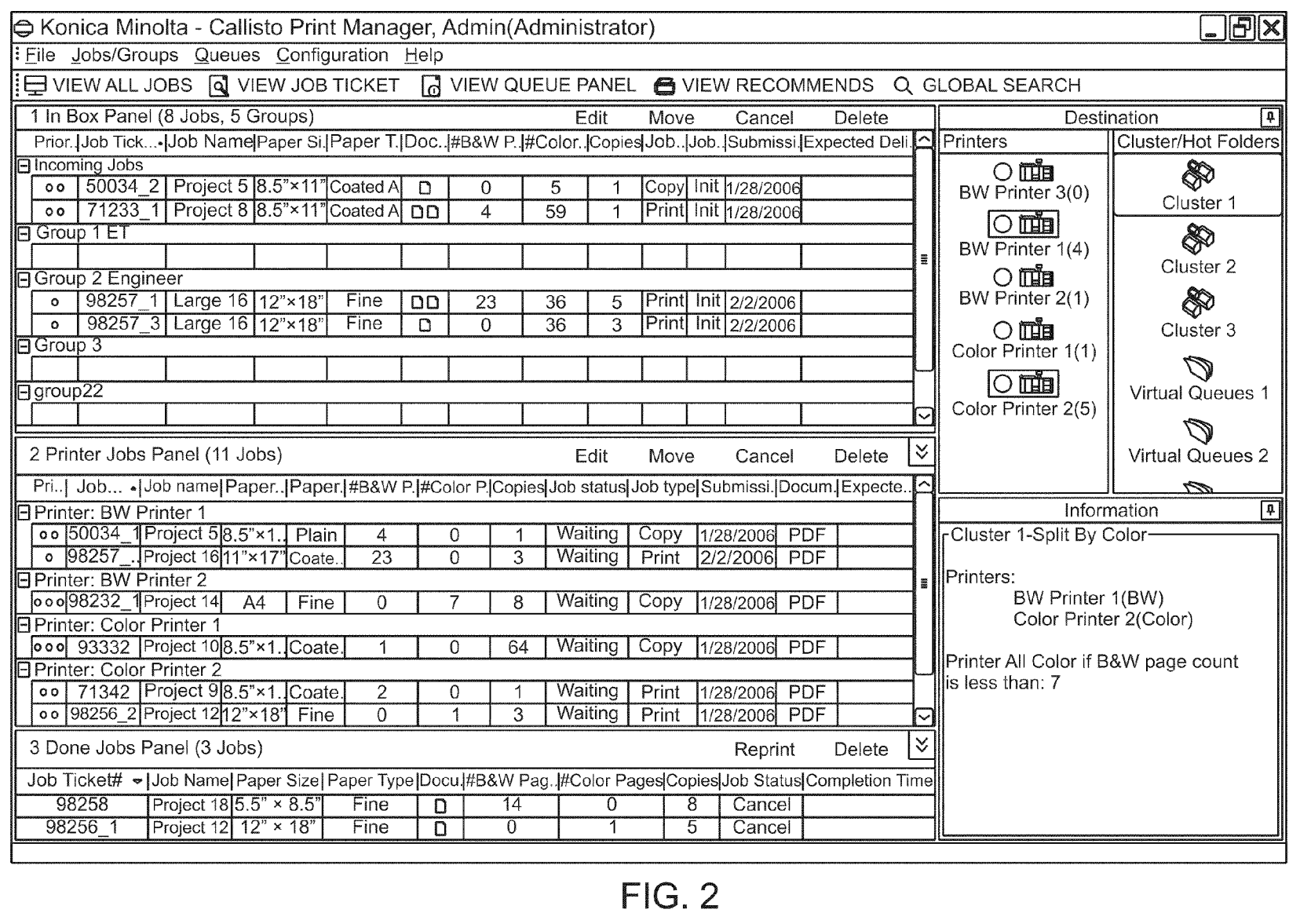

In order to process numerous print jobs using multiple printers in an efficient and organized manner, the print job management server 4 according to embodiments of the present invention presents a Main Screen shown in FIG. 2 on a display monitor of the server 4 (or on a monitor of client computer 1 or 2 or on a monitor of any one of the printers 5-9 when remote access to the print job management software is possible at the client computer or the printer). The Main screen contains three panels: In Box Panel, Print Jobs Panel, and Completed Jobs Panel. These three panels are provided for visually presenting a classification of print jobs according to their processing phases. Using these panels, the operator can readily discern the overall status of print job processing as well as the status of each print job at a glimpse.

Referring to FIG. 2, the In Box Panel contains all new incoming print jobs sent to the print job management server 4 under the header of "Incoming Jobs." One row in the In Box Panel contains one print job. Print jobs listed in the "Incoming Jobs" in the In Box Panel have not yet been assigned to a printer(s). The Job Ticket Number column lists job numbers assigned to respective print jobs. Values of select job parameters, such as Paper Size, Paper Type, Document Color, Job Types, the number of copies/prints, etc., are also indicated in the In Box Panel. The Printer Jobs Panel displays active jobs at all the printers monitored by the print job management server 4. That is, the Printer Jobs Panel lists print jobs that have been assigned to a printer (or printers), but that have not been completed by the assigned printer(s). The Completed Jobs Panel displays completed or cancelled print jobs. Values of select job parameters, such as Paper Size, Paper Type, Document Color, Job Types, the number of copies/prints, etc., are also indicated in the Printer Jobs Panel and the Completed Jobs Panel.

Each of these panels can be selectively expanded to a desired size or can be closed or opened separately by a simple user command, such as one or a few mouse clicking operations, so that the user can quickly obtain a desired view arrangement. In the example of FIG. 2, the operator can click on the header of the Panel to collapse or expand the selected Panel. Moreover, the server can be configured such that by grabbing the header of a Panel by the mouse pointer and dragging away from the Main Screen, a separate and independent window containing the selected Panel can appear in the display monitor.

These features allow the user to focus on a particular task at hand. For example, in the morning, print shop operators may need to check all new print jobs that are listed in the In Box Panel to determine the priority and to understand what type of print jobs need to be processed on that day. The operator may use grouping features (which will be described in detail below) to organize the new print job and to determine printer assignment. These tasks can be made easier if the operator expands the In Box Panel to a larger size (to the entire display monitor, for example) and minimizes or closes the other two Panels. Once the operator analyzes and organizes the new print jobs, the operator assigns the new print jobs to appropriate printers. Then, the operator may focus on monitoring the progress of the printing operations in order to maximize the usage of all available printers. The expanded Printer Jobs Panel is suitable for such monitoring work. In the evening, print shop operators may check the results of the printing operations. The operators can efficiently perform this task by expanding the Completed Jobs Panel, and closing the other two Panels. Thus, depending upon what tasks the operators wish to focus, the In Box Panel, the Printer Jobs Panel, and the Completed Jobs Panel can be selectively opened, expanded, or closed by a user command.

Various modifications are possible to the above-examples. For example, the Completed Jobs Panel may be configured to include print jobs that have been completed, but not print jobs that have been cancelled. In such a case, an additional panel "Cancelled Jobs Panel" may be provided to list print jobs that have been cancelled. Alternatively, if desired, the Cancelled Jobs Panel may be provided in place of the Completed Jobs Panel. Also, one or more additional panels may be added to further assist the operators. For example, an Archive Panel may be provided to archive print jobs that have been completed or cancelled. The print management server may be configured to automatically archive print jobs that have been completed and that have been sitting in the Completed Jobs Panel for more than two (2) days, for example. Of course, a use can manually move any print job to the Archive Panel. The Archive Panel may be hidden usually, and upon a user command can open to show the archived print jobs. Alternatively, the server can be configured to list the Archive Panel header in the In Box Panel for easy access. Furthermore, the following additional panels may be provided: a Hold Job Panel for listing print jobs that are held off, a Stopped Job Panel for listing print jobs that are stopped by a user intervention or due to mechanical problems at the assigned printer, a Urgent Job Panel for listing print jobs that need to be processed urgently, and a Job Per Printer Panel to list print jobs that are assigned to a particular printer. One or more of these panels may be additionally provided in the In Box Panel or may be made user accessible. These and the above-described panels may be selectively opened, expanded or closed according to user commands that can be entered by the GUI or the like, depending the needs of the user.

All Jobs Panel

Professional print shops often receive many inquires from customers, asking the status of their print jobs, for example. Needless to say, timely and accurate responses to these customer inquires are vital to a success of the print shop operations. To facilitate this aspect of the print shop business, the print management apparatus according to embodiments of the present invention is provided with an easily accessible single panel to list all of the print job that are managed by the print management apparatus so that the operator can discern the status of the print jobs quickly and accurately, and can easily locate the desired print jobs along with the relevant information.

Figure 14:
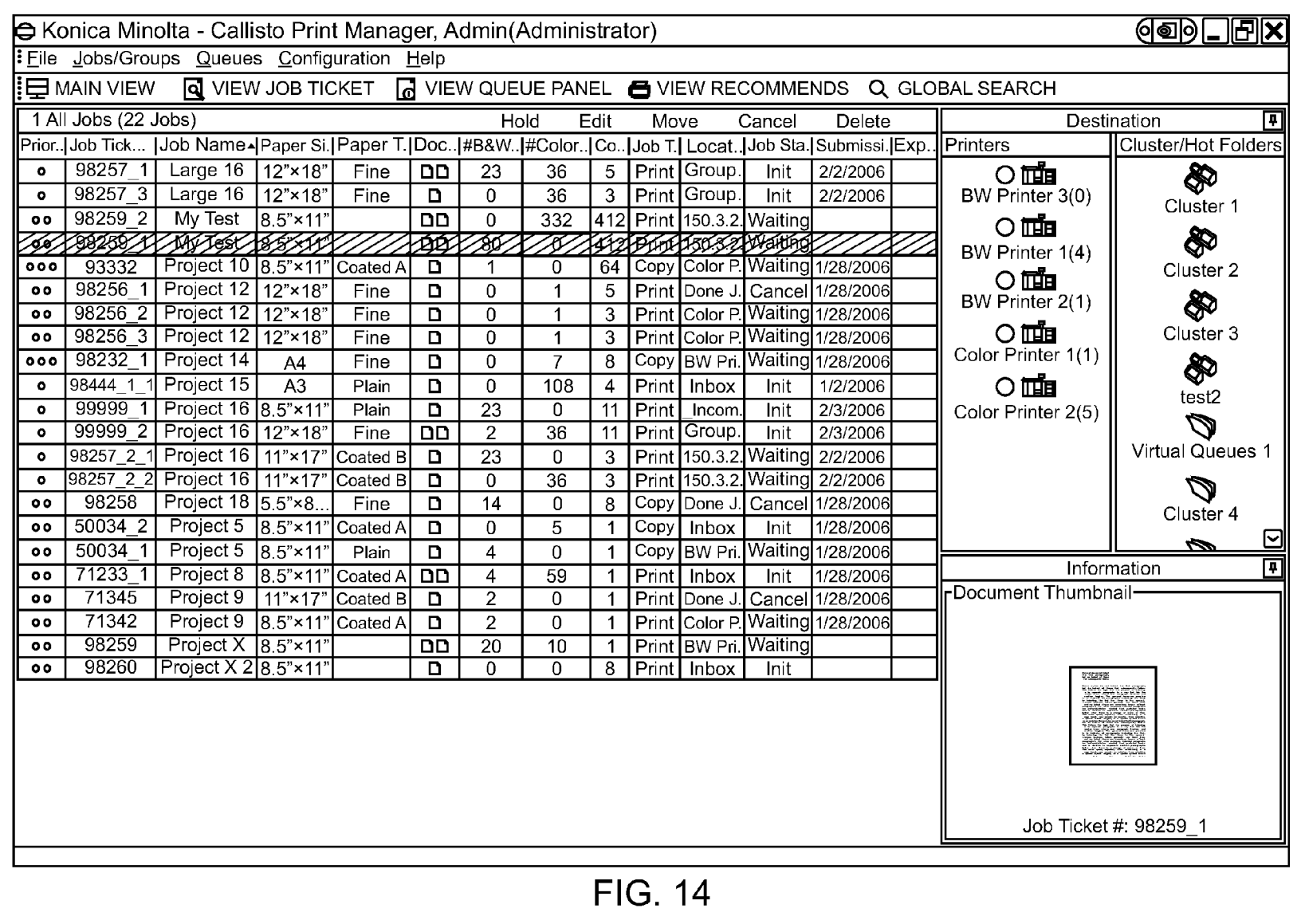

FIG. 14 illustrates an example of such a panel, entitled "All Jobs Panel," according to an embodiment of the present invention. The All Jobs Panel can be accessed by clicking on the "View All Jobs" button at the top-left corner of the Main Screen shown in FIG. 2, for example. Referring to FIG. 14, the All Jobs Panel lists all print jobs that are currently managed by the print management apparatus in a single panel. Of course, if all the print jobs cannot be displayed in one window because of its large number, the panel will be provided with a scroll bar on the right, for example, to allow the user to scroll down the entries.

As shown in FIG. 14, the All Jobs Panel of this example lists the print jobs in a table format and includes a number of columns to visually show various job parameter values and the status of each print job listed. This example lists Priority, Job Ticket Number, Job Name, Paper Size, Paper Type, Document Color, the number of B&W pages, the number of color pages, the number of copies, Job Type, Location, Job Status, Submission Time, and Expected Delivery Time. The Location indicates where the print job are located—whether it is in the In Box Panel, whether it has been assigned to a particular group or particular printer (or printers), or whether it is in the Completed Jobs Panel. If there are other locations, such as the archive folder, this column can indicate such other locations. The Job Status indicates the status of each print job—whether cancelled, waiting, or just arrived, for example.

When a user selects one of these columns by clicking on the header of the column, the print management server sorts the print jobs according to the selected variable. By clicking on the same column header again, the sorting toggles between the descending order and the ascending order. Also, these columns may be added or removed based on user instructions so that the All Jobs Panel can be customized based on the user's needs.

Using the All Jobs Panel, the operator can expeditiously locate a print job and relevant information associated with it in order to respond to customer inquires in a timely manner. For example, when the operator looks up for a relatively recently arrived print job having a large Job Ticket number, the operator can click on the Job Ticket # header on the All Jobs Panel to sort the print jobs in the descending order to quickly find the Job Ticket number. Then the operator can look up the Location and Job Status columns to find out the status of the print job.

In order to switch back to the Main Screen, the operator simply needs to click on the Main View button at the top-left corner of the screen (which has been changed from the View All Jobs button; compare FIG. 14 with FIG. 2). Thus, the operator can easily toggle between the Main Screen and All Jobs Panel. This will significantly enhance the responsiveness of the print shop to customer inquires without interfering with printing operations of the print shop.

The All Jobs Panel may also be made accessible by another user at a remote computer or a client computer connected to the server. Then, such another user at the separate computer can look up the All Jobs Panel and perform desired work without interrupting the operator using the Main Screen at the display monitor of the print management server. In the example of FIG. 1, another operator can look up the All Jobs Panel at client computer 1 or 2 while the operator at server 4 continues to use the Main Screen having the three panels. This will further improve the efficiency of the print shop operations.

Destination Panel

At the right-hand side of the Main Screen of FIG. 2 is the Destination Panel indicating all the connected printing devices for processing print jobs. In one embodiment, the Destination Panel displays icons of printing devices and is divided into two sections: Printers and Clusters/Virtual Queues. The Printers pane shows icons of actual physical printers that are connected to the server. The Clusters/Virtual Queues pane shows Clusters and Virtual Queues. Clusters and Virtual Queues are software-defined virtual printing devices to which print jobs can be submitted for performing designated printing operations, and will be described in more detail below.

The operator can drag and drop a print job from any of the Inbox, Printer Jobs Panel and Completed Jobs Panel to one of the icons displayed in the Destination panel. The result is that the print job management server forwards the print job to the selected printing device so that the designated Printer (or Cluster or Virtual Queue) starts processing the corresponding printing operation. As a result, the print job entry in the In Box Panel moves to the Printer Jobs Panel. Once the print job is completed, the job entry moves from the Printer Jobs Panel to the Completed Jobs Panel.

A Cluster is a software-defined virtual printing device designed to perform a certain class of print jobs more efficiently and accurately. It is a combination of two or more of printers with a specified rules/algorithm. When a print job is assigned to a Cluster, the print job is split into two or more sub-jobs by preset or user-defined rules/algorithm, and these sub-jobs are processed by the respective printers designated by the Cluster. For example, suppose that a print job (Job No. 12345) containing 10 color pages and 20 B&W pages is submitted to a Cluster that combines Color Printer 1 and BW Printer 1 with a rule requiring all color pages to be printed by Color Printer 1 and all B&W pages to be printed by B&W Printer 1. Then, the print job is divided into sub-job 1 containing all color pages and sub-job 2 containing the remaining B&W pages. Thereafter, sub-job 1 is sent to the Color Printer 1 and sub-job 2 is sent to B&W Printer 2 for respective printing operations.

In this particular embodiment, a five (5)-digit job number is assigned to a new print job, and if the job is split into two or more sub-jobs (as a result of being assigned to a Cluster, for example), these split jobs bear a supplemental number separated by an underbar to indicate their association. In the above example, when the Job No. 12345 is sent to the Cluster, the print job is split into Job No. 12345_1 for color pages and Job No. 12345_2 for B&W pages. Upon this split, Job No. 12345 disappears from the In Box Panel, and Job No. 12345_1 appears under "Color Printer 1" and Job No. 12345_2 appears under "BW Printer 1" in the Printer Jobs Panel of the Main Screen. When the respective sub-print job is completed, the sub-job entry is moved from the Printer Jobs Panel to the Completed Jobs Panel. The print management server can be configured such that when all the sub-print jobs are completed and the corresponding entries of the sub-jobs are moved from the Printer Jobs Panel to the Completed Jobs Panel, theses sub-jobs are merged back and appear as one entry—Job No. 12345 appears in the Completed Jobs Panel in the above example. Of course, if desired, this feature may be deactivated so that the entries of the sub-jobs remain in the Completed Jobs Panel.

A Virtual Queue overrides any job parameter values of a print job that do not match the values of corresponding job parameters specified by the Virtual Queue. For example, a Virtual Queue may specify a particular B&W printer, tray, paper size, and a particular paper type (such as plain paper). In this case, when a print job designating color printing on A4-size 24 lb paper is sent to a Virtual Queue that specifies a particular B&W Printer and letter-size 18 lb paper, for example, the print job management server ignores these original job parameter values of the print job and replaces them with the job parameter values specified by the Virtual Queue. As a result, the B&W printer prints out grey-scale images on letter-size 18 lb paper. This feature is useful when the existing printer settings do not match the requirements of a print job, but the customer requests a quick review of the document first, for example.

The server 4 may also be configured such that when all the printings regarding the split print jobs are completed, the server 4 moves these jobs to Completed Jobs Panel in the Main Screen. That is to say, according to the specific example presented above, when both printings regarding Job Nos. 12345_1 and 12345_2 are completed, these Jobs move to Completed Jobs Panel in the Main Screen. In a preferred embodiment, the split jobs are combined when their printings are completed, and the original Job Number of the print job appears in Completed Jobs Panel. Virtual Queues and Clusters described above may be created by users or the print shop operators, depending on their needs. Default or sample Clusters and Virtual Queues may also be provided as part of the print job management software for convenience to users. For example, through a drop-down menu from the "Queues" item at the top bar of the Main Screen, a user may select "Cluster" and then "New" to open a Cluster Editor to create or edit a Cluster.

Double clicking on an icon in the Destination Panel provides the user with an access to the detailed properties of the Printers, Clusters, and Virtual Queues. More specifically, when a user double-clicks on a device in the Destination Panel, a separate window appears displaying detailed information about the printer (or virtual printing device), such as printer operating status, the number of outstanding print jobs that need to be processed before processing a new print job. In the case of a Cluster (or a Virtual Queue), the pup-up window includes which printers (or a printer) are designated by the Cluster (or the Virtual Queue) and the rules for assigning a print job to the multiple printers (or the printer).

Operators often need to quickly identify the operating status and queue information of each possible printing device option to determine which printer (or virtual printing device) is suited for a particular print job. The Destination Panel and Main Panel of this example has the following various features to assist such operators.

In the Destination Panel, the parenthesized number at the Printer, Cluster and Virtual Queue icons visually indicates the number of jobs in the respective print queue (i.e., a waiting list (a print spooler) indicating the number of outstanding print jobs that need to be processed before processing a new job.). Other status of the printers (and Cluster and Virtual Queue), such as "disconnected," "unavailable," "Error," "Toner Low," etc., may also be visually or pictorially indicated at or in the vicinity of each icon or in a separate pane. For example, the server may utilize appropriate color (such as green, yellow, red, etc.) or other pictorially appealing visual presentation scheme to indicate various operating status of the printers listed in the Destination Panel. The operating status in this context may include "Active" or "Normal," "Disconnected," "Error," "Serviced," "Toner Low," "Paper low," "Connection Speed Low," etc. For example, "Active" may be indicated by a green circle in front of the printer, "Error" may be indicated by a red circle, and "Toner Low" and "Paper Low" may be indicated by a yellow circle. Accordingly, the operator can quickly and accurately recognize the availability of each printer. This will significantly reduce errors when the operator manually assigns print jobs to printers or virtual printing devices.

In the example of FIG. 2, the parenthesized number zero "0" at BW Printer 3 indicates that there is no outstanding job at that printer. And the green circle in front of the printer shows that the operating status of the printer is "Active" indicating that the printer is fully operational. FIG. 2 also shows that BW Printer 2 has one (1) outstanding print job. The red circle in front of the printer indicates that the printer needs to be serviced or is not operational at this time.

This color coding or similar visual presentation indicating the operating status of each printer described above can also be utilized to provide quick, at-a-glimpse presentation of the overall status of the printer to users. Based on pre-defined or user specified rules/algorithm, the server can be configured so as to determine the degree of the availability of each printer by taking into account both the number of print jobs in the print queue and the operating status of the printer, for example.

Figure 3:
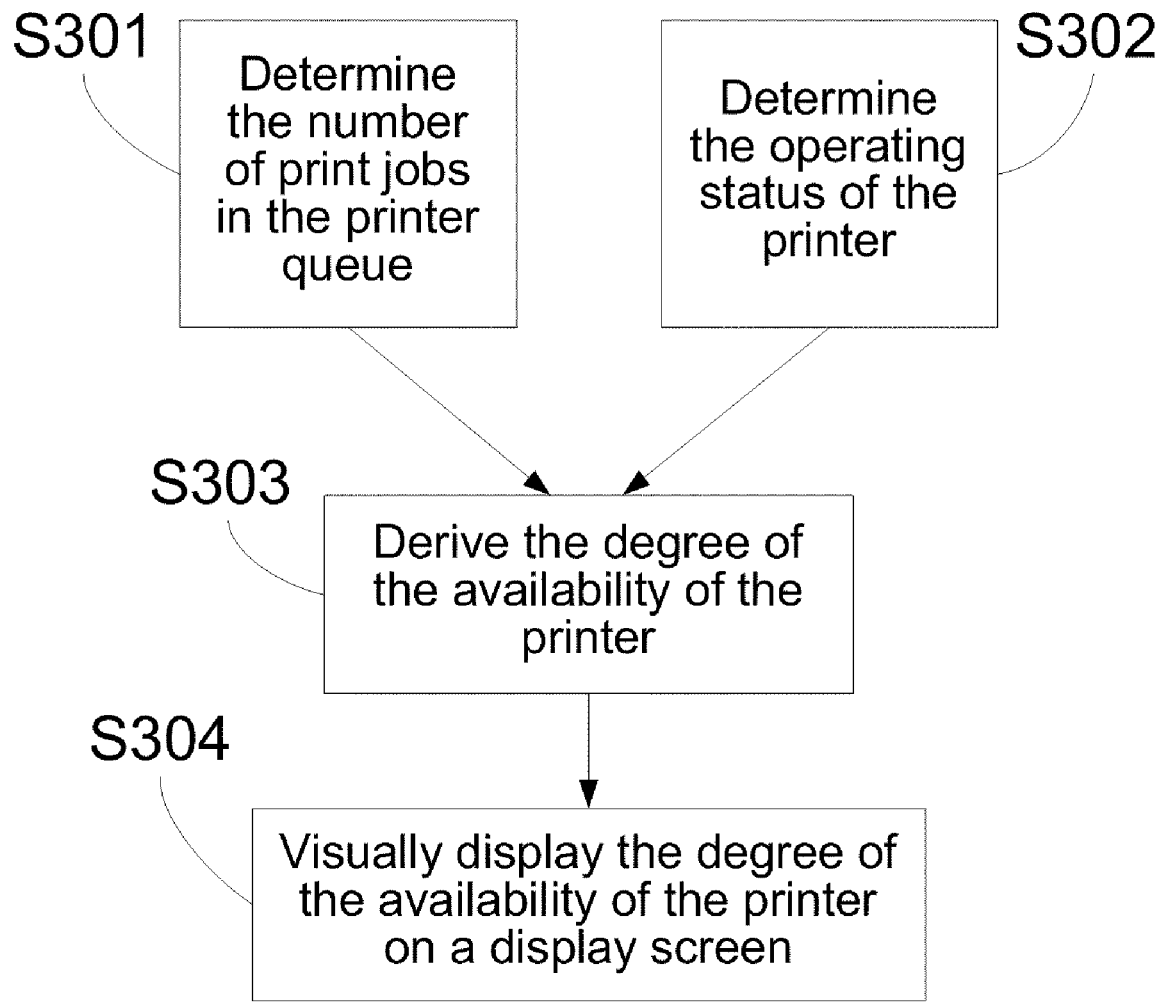
FIG. 3 schematically illustrates a method of managing printers in accordance with an embodiment of the present invention.

FIG. 3 shows an example of such an algorithm. In step S301, the server communicates with each of the printers attached to it and determines the number of the outstanding print jobs that need to be processed before processing a new print job at that printer. In step S302, the server determines whether the printer is operational. As described above, the printer may not be accessible because of maintenance, or the toner or paper may be low at that particular printer, or the connection speed may be particularly slow at that printer. This step obtains information on such operating status of the printer. In step S303, the server analyzes the results of steps S301 and S302 to derive the degree of the availability of the printer. For example, the server can assign the lowest grade to all printers that are found to be non-operational. It may assign the highest grade to all printers that have less than 3 outstanding print jobs in the print queue, and are fully operational. The server can assign an intermediate grade to all other printers. In step S304, the server causes the display monitor to visually display the degree of the availability derived in step S303 so that the operator can readily identify the availability. For example, the highest grade may be indicated by a green circle in front of the printer. The intermediate grade may be indicated by a yellow circle in front of the printer, and the lowest grade may be indicated by a red circle.

Because of the ease in recognizing the status, the color coding or similar pictorial presentation of the availability of the printing devices, as described in the various examples above, is particularly useful when the operator needs to assign a large number of print jobs to various actual or virtual printing devices within a short period of time.

Furthermore, in the example of FIG. 2, when a pointer is moved over an icon in the Destination Panel by a mouse movement or the like and then is left unmoved at that position for a short period of time, more detailed information and/or additional information regarding the printing device is displayed in a small pup-up windows that appears in the vicinity of the icon. For example, when a mouse pointer is moved over the BW Printer 3 icon, and is left still for one second, a small rectangular window appears, which textually shows the IP address, the model name, and the operating status of the printer, for example. This feature further assists the user in quickly determining a desired printing device.

In another embodiment, when a user clicks on one of the icons of the virtual printing devices displayed in the Destination Panel, all of the actual physical printers (or a printer in the case of Virtual Queues) that are associated with the selected virtual printing device are highlighted to pictorially identify the associated printers (or the associated printer). FIG. 2 shows that Cluster 1 is selected by clicking on that icon. As a result, BW Printer 1 and Color Printer 2 are highlighted, indicating that these printers will be used when Cluster 1 processes a print job. This feature is advantageous because the user can quickly identify what physical printer(s) is designated by the selected virtual printing device and, when coupled with one or more of the above-described pictorial printer availability indication, the user can quickly and reliably determine whether the selected virtual printing device can process the print job without a long waiting period or additional manual tasks. This will significantly help reduce the time required for the operator to assign print jobs to appropriate virtual printing devices.

Located below the Destination Panel is Information Panel. The Information Panel displays various information concerning the item which the operator has selected using the mouse pointer or the like. The operator can select any active item that appears in the Main Screen (or in any window that can open in the print job management software) to display information relating to the selected item in the Information Panel. In one embodiment, such an active items include: job ticket entries, group headers in the In Box Panel, printer headers in the Printer Jobs Panel, and icons in the Destination Panel. This feature is particularly useful when coupled with the visual presentation of the Cluster and Virtual Queue configurations described just above. For example, as shown in FIG. 2, when the operator selects Cluster 1, causing highlighting of BW Printer 1 and Color Printer 2 in the Destination Panel, the Information Panel below indicates that Cluster 1 splits a print job by color, and when the black and white page count is less than 7, all the printing will be performed by Color Printer 2. That is, the Information Panel displays the rules associated with this Cluster without requiring the user to open a separate window. This will further help the user quickly search for and locate a desired printer or virtual printing device for processing a print job.

The method of selecting active items and printing devices in various examples above is not limited to clicking operations by a mouse or other pointing device. For example, the server may be configured such that simply locating a pointer over a Cluster or Virtual Queue icon will trigger the highlighting of the associated printers and the display of the relevant information in the Information Panel. Various other selection operations in GUIs, such as giving a voice command or touching on an icon on a touch screen, can also be used.

Also, the Destination Panel and the Information Panel, respectively, can be removed from the Main Screen to appear as a separate window in the display screen by double-clicking the header bar of the respective panels, for example, and by mouse operations, can be moved to a convenient location on the display monitor.

Job Ticket

In embodiments of the present invention, print jobs are organized by using database entries, named "Job Tickets." A Job Ticket specifies values of various print job parameters, such as paper size, paper type, user identification information and other related information, and associates itself to the source file(s). To view the content of the Job Ticket, a user can right click on a print job entry in any of the In Box Panel, the Printer Jobs Panel, and the Completed Jobs Panel, and selects "View Job Ticket" from a pup-down menu, for example.

Based on instructions and information received from a customer, a print shop operator may manually enter the values of these job parameters using a Job Ticket Editor screen, which is a graphic user interface (GUI) accessible from the Main Screen by an operator through a Windows pup-down menu or other means.

Figure 4:
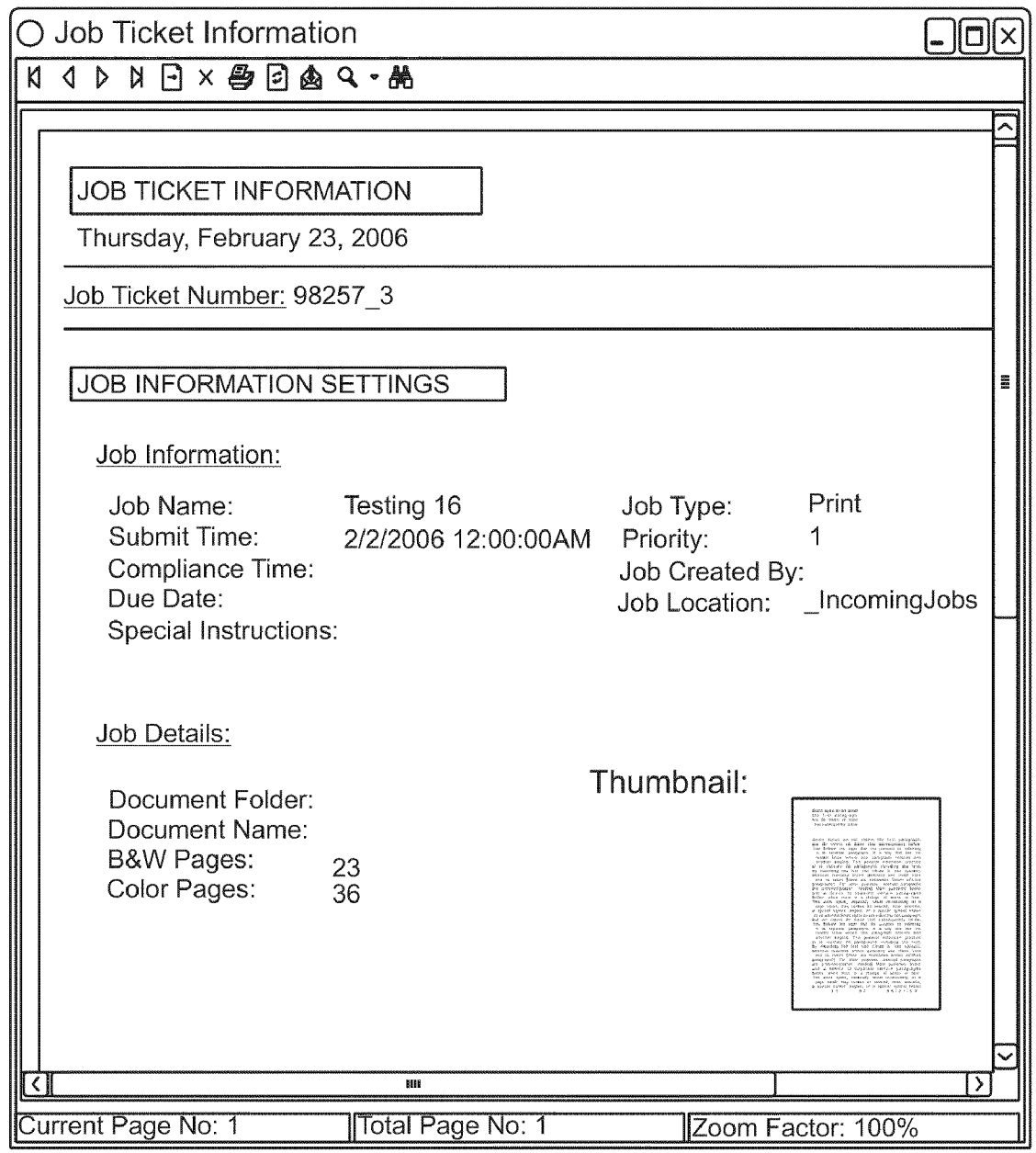
FIG. 4 schematically illustrates a data content of a Job Ticket according to an embodiment of the present invention.

FIG. 4 shows an example of the data content of a Job Ticket. Referring to FIG. 4, in this particular example, a Job Ticket includes a Job Ticket number, Ticket Name as well as the values of the following groups of various other job parameters: Job Info Settings, Basic Settings, Layout Settings, Cover Sheet, Finishing Settings, Inter-Sheet Settings, Tab-Paper Settings, Image Quality Settings, and Customer Information.

Job Info Settings include Job Name, Submit Time, Completed Time, Due Date, Type (print or copy), Priority, the identity of the person who created the Job Ticket, Job Location, and Queue Recommendation (i.e., a recommendation on a particular printer or other destination). Job Info Settings further include the directory pass at which the file containing the document to be printed is located in a local or networked hard drive, the number of B&W pages, the number of color pages, and Special Instructions.

Basic Settings include the number of copies to be made, the orientation of paper (portrait or landscape), information on collate printing, information on offset printing, the original paper size, the output paper size, the paper type, and paper source information, such as tray numbers. Layout Settings include settings concerning print layout. Cover Sheet includes settings on cover sheets to be produced or prepared. Finishing Settings specify paper finishing settings, including the paper binding options, such as stitch, staple, and punch.

In addition, the server may be configured to access and analyze the source file to determine the values of some of the job parameter directly from the source file. Then the server enters these values in the corresponding job parameter entries in the corresponding Job Ticket without requiring a user to manually enter them. This will help eliminate clerical errors and further facilitate the operation of the print shop.

In this application, the term "value" means, when referred to with respect to variables or parameters, any numerical quantity, characters, and other types of entries that can specify variables or parameters, and including, but not limited to, a specific setting of any of the job parameters appeared herein.

Job Grouping

Each day, a print shop receives a large number of new print jobs specifying a variety of printing requirements. As arrived, these print jobs are not organized, yet they must be processed promptly and accurately. Embodiments of the present invention offer an efficient and highly transparent organization of incoming print jobs to facilitate the operation of a print shop. To this end, a print job management server of embodiments of the present invention analyzes incoming print jobs and classifies the incoming jobs into several or more groups based on prescribed criteria so that the incoming print jobs are purposefully organized and arranged for use in subsequent processes by the server and the operator.

Figure 5:
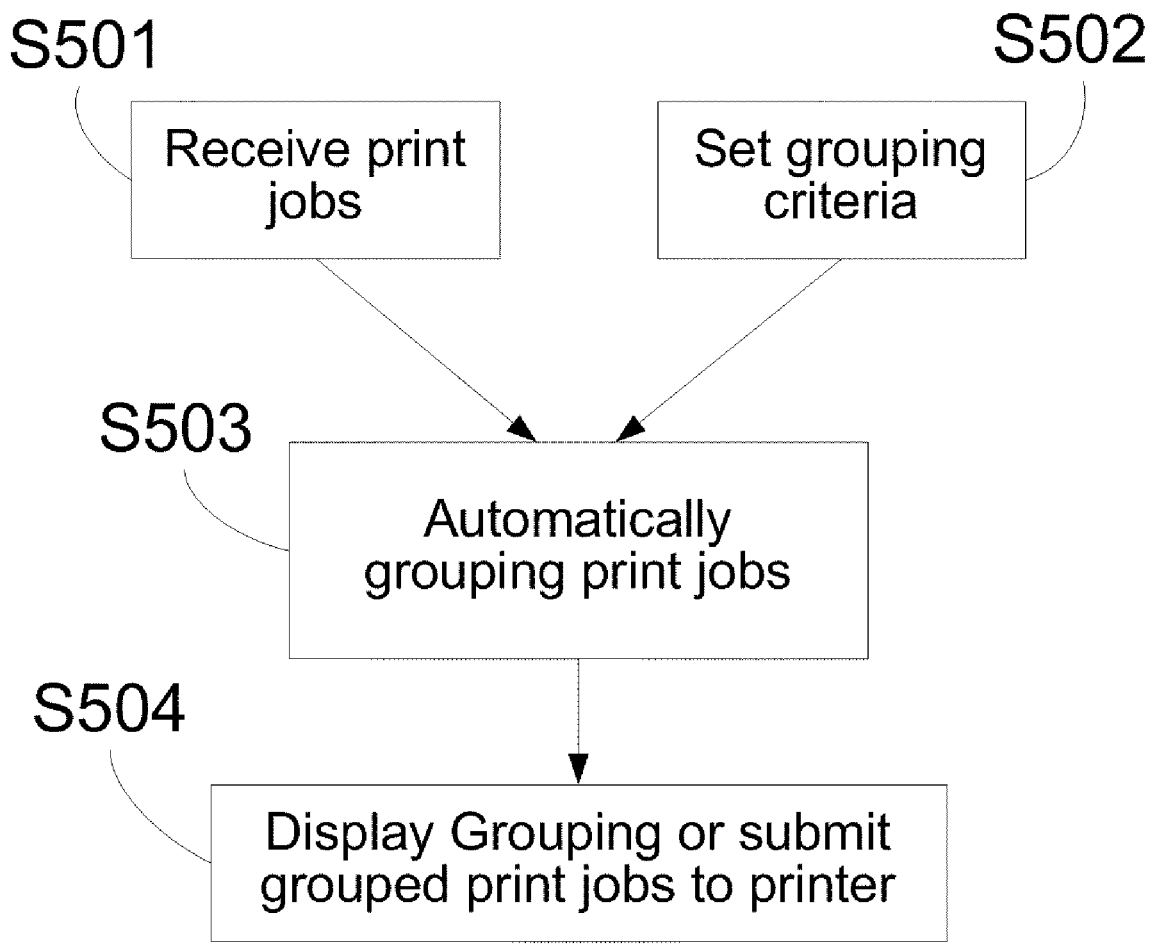
FIG. 5 is a flow chart illustrating a method for managing a plurality of print jobs according to an embodiment of the present invention.

FIG. 5 is a flow chart illustrating a method for managing a plurality of print jobs, which is implemented in a print job management server, according to an embodiment of the present invention. In step S501 the print job management server receives a plurality of print jobs. In Step S502, the server prescribes grouping criteria for classifying incoming print jobs. Step S501 can be performed before or after Step S502, or at the same time. With the grouping criteria set in step S502, the print job management server automatically classifies all incoming print jobs into groups without requiring any user intervention (S503). In step S504, the print job management server transmits a result of the grouping for use by the user or the print management system. For example, in step S504, the server may cause an attached display monitor to display the result of the grouping to a user so that the user can utilize the grouping information in subsequent operations. Also, print jobs that have been assigned to a particular group may manually or automatically be submitted to a particular printer for printing.

Once the grouping criteria is given, the print job management server of embodiments of the present invention can be set up so as to analyze all incoming new print jobs automatically to start the grouping operation on the incoming print jobs (referred to as "Auto Grouping Mode" hereinafter). Alternatively, the print job management server can be set up such that all incoming print jobs are first placed under the Incoming Jobs header in the In Box panel and the grouping operation is commenced upon a request form a user (referred to as "On-Demand Grouping Mode" hereinafter). At any rate, in both Modes, once grouping is initiated, there is no need for the user to intervene the operation—the grouping of the print jobs continues until the user interrupts, or until the grouping is completed. If a print job is determined not to belong to any of the existing Groups, such a job is left under the Incoming Jobs header in the In Box panel as unassigned.

Figure 6:
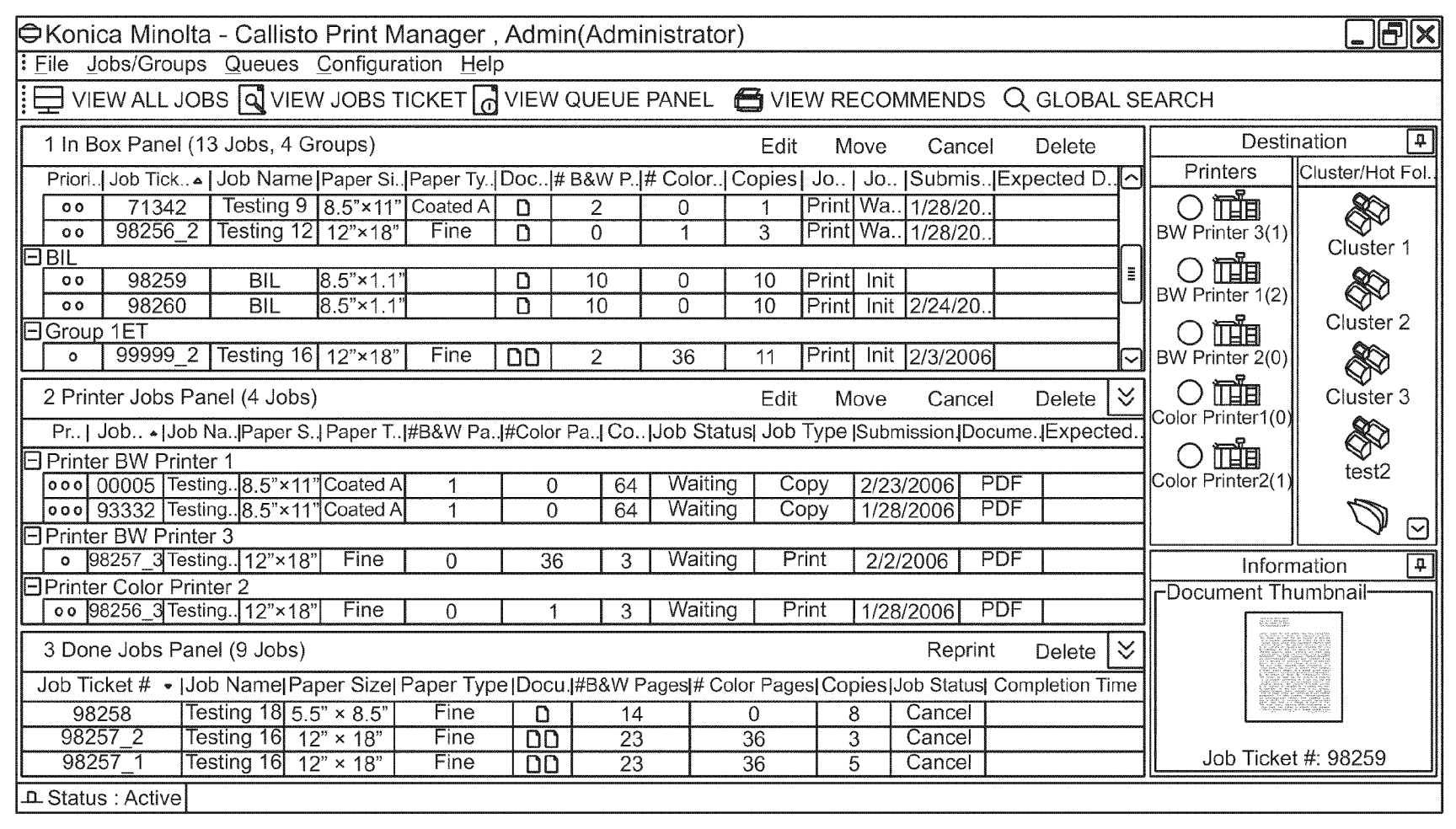

FIG. 6 shows In Box Panel displaying a result of a grouping operation. As shown in FIG. 6, grouped print jobs are placed under respective group headers in the In Box Panel. Basic job parameter values of each print job are also conveniently displayed on the screen. This particular In Box Panel shows that there are at least two Groups currently: Group BIL and Group 1 ET. Group BIL contains 3 print job entries. The print jobs listed under Group BIL all have the same priority setting, the same paper size and the same color setting (B&W). However, a print job entry under Group 1 ET (Job No. 99999_2) differs from the entries under Group BIL in at least paper size and color settings. This visual presentation provides a user with convenient and reliable access to the status of print job grouping. For example, it reduces the amount of time operators have to spend in matching print jobs to printers (or virtual printing devices, such as Clusters and Virtual Queues), and also allows more efficient use of printers. With appropriately designed grouping criteria, all print jobs categorized in a particular group may be sent to a single destination device, such as a particular printer, Cluster, or Virtual Queue, at once. For example, the three entries under Group BIL in FIG. 6 may be submitted to an appropriate B&W printer at once.

Manual Creation of Target Groups

Figure 7:
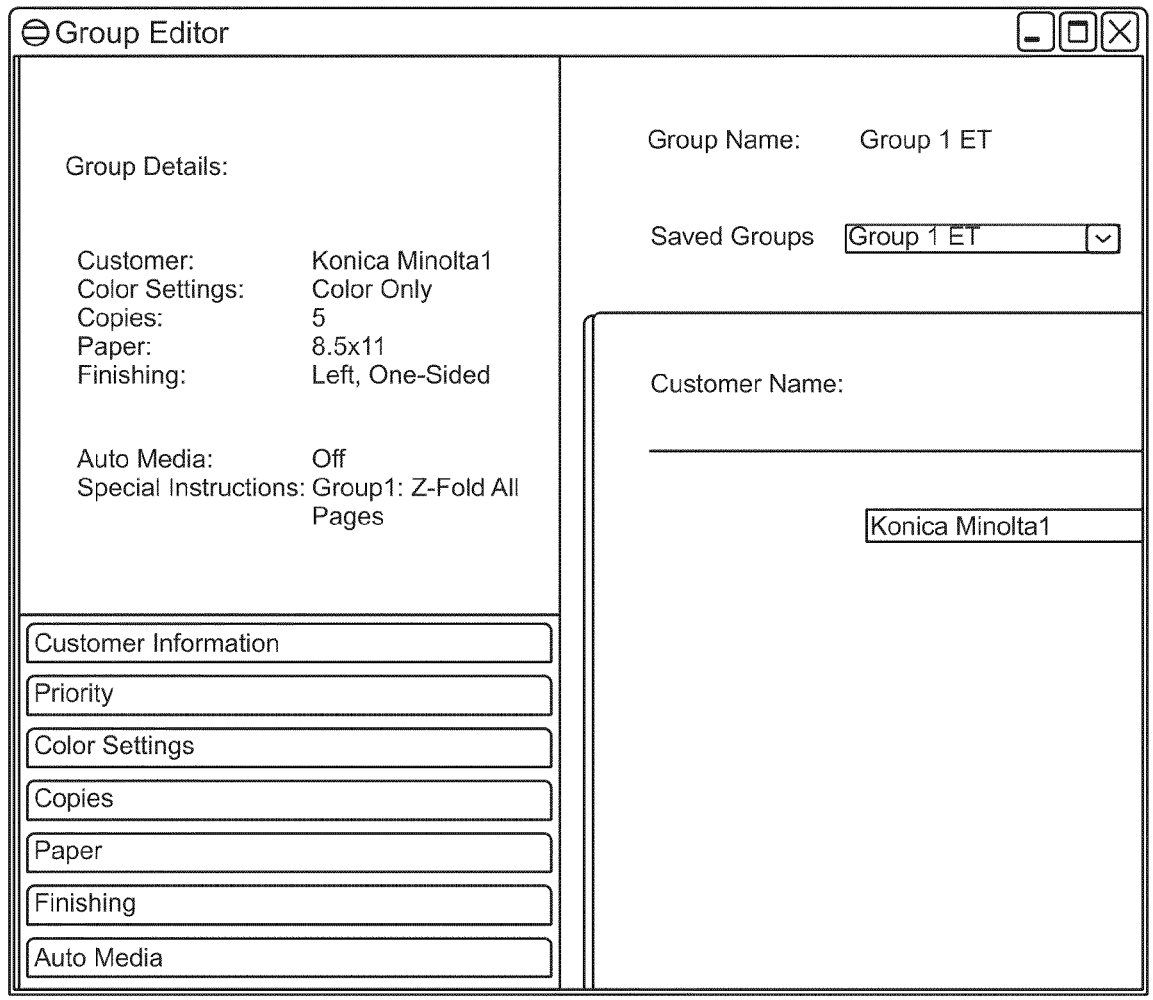
FIG. 7 schematically illustrates a Group Editor screen according to an embodiment of the present invention.

As the grouping criteria for grouping print jobs, fixed target Groups to which incoming print jobs are being assigned can be specified in advance. For example, a print shop operator can manually create each target Group by specifying values of certain job parameters using a Group Editor screen, which is accessible from the Main Screen by the operator. FIG. 7 schematically illustrates an example of the Group Editor Screen. As shown in FIG. 7 an operator can type in, or choose from the drop-down menu, values of these job parameters. In this particular example, the job parameters that can be specified by the user to define a Group include Customer Information (e.g., the customer name), Priority (high, medium, or low), Color Settings (Color Only, Black & White only, Mixed), Copies (the number of copies), Paper (size, type, weight color, input tray number), Finishing, and Specific Instructions. In a preferred mode, a set of the job parameters that can be set to define a Group is a subset of the job parameters that can be set to define a Job Ticket (thereby a print job) described above.

Alternatively, a Group can be created by referencing to a particular print job. The operator may select a single print job and use the Group Editor to create a new Group by imposing all or part of the job parameter values of the selected job onto the new Group. For example, the print job management server can be set such that by right-clicking on a print job entry in the In Box Panel on the screen, the operator can choose the "Create Group" option to open the Group Editor screen that already contains all job parameter values transferred from the Job Ticket of the print job. The operator can then accept all the values, as it is, or if desired, delete or modify some of the job parameter values to create a Group. This way, the operator can easily create desired Groups.

While the above example of the Group Editor allows the operator to set the values of numerous job parameters, the operator does not have to specify the values of all of the job parameters that appear in the Group Editor to define a Group. By setting only some of the job parameters, a Group defined by only those job parameter values (high-level group) can be created. For example, if a Group is created by setting the job parameter "Color" to "Black and White" and the job parameter "Paper Size" to "8.5×11," all incoming jobs that have the same values in Color and Paper Size job parameters (i.e., B&W and 8.5×11) will be placed in that Group regardless of the values of other job parameters. Thus, depending on the user needs and design of the system, mutually exclusive Groups, overlapping Groups, and hierarchically structured Groups can be created. However, if desired, the server can permit only certain types of group creations. For example, it can be configured so that only mutually exclusive Groups can be created by a user. Furthermore, instead of specifying particular values of job parameters, a range of job parameters can be specified to define Groups.

Further, default Groups can be provided so that often-used Groups are pre-installed in the print job management server. The data that defines default Groups can be stored in a storage device that is accessible from the print job management server.

Figure 8:
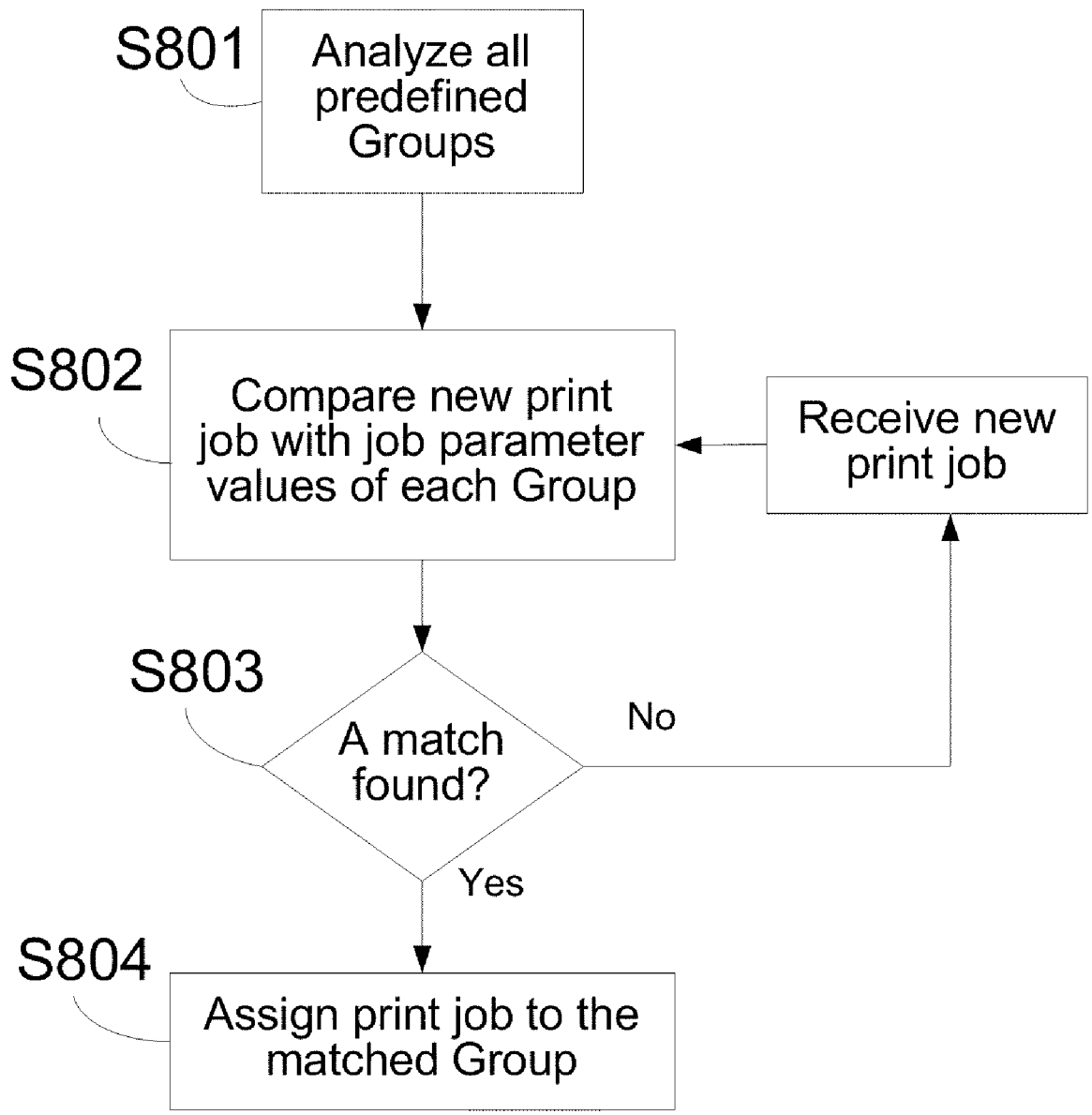
FIG. 8 is a flow chart illustrating a grouping method according to an embodiment of the present invention.

FIG. 8 illustrates a grouping method using predefined Groups according to an embodiment of the present invention. Thus, this example assumes that the server already defined Groups into which incoming print jobs will be placed, as the grouping criteria. The print job management server first analyzes all the predefined Groups created by a user (S801) to determine the properties of the predefined Groups, and compares the job parameter values of the Groups with the values of the corresponding job parameters of the incoming print job (S802). If an incoming job defined by a Job Ticket matches the job parameter values of a Group (S803), the job is placed in that Group (S804) and listed under the header of that matching Group in the In Box Panel on the screen. For example, suppose that Group 1 ET is defined by specifying values of the job parameters of Customer, Color Settings, Copies, Paper, Finishing, and Special Instructions. If the print job management server finds a print job that has exactly the same respective values in these job parameters, such a print job will be placed under the Group 1 ET header in the In Box Panel. Other appropriately designed comparison/grouping algorithms may also be used.

Automatic Creation of Target Groups

Rather than using predefined or user-specified static Groups, the print job management server can be configured such that target Groups are created dynamically based on the job parameter values of incoming print jobs. In this mode, the server first determines one or more of the job parameters to look for, and analyzes the values of these job parameters in incoming print jobs. According to the values of the job parameters, the server groups the incoming print jobs into separate groups. Thus, groups are created based on values of these particular parameters in the incoming print jobs, thereby eliminating the user's need to create Groups. The print job management server can use this scheme as the grouping criteria for conducting the automatic grouping operation.

Figure 9:
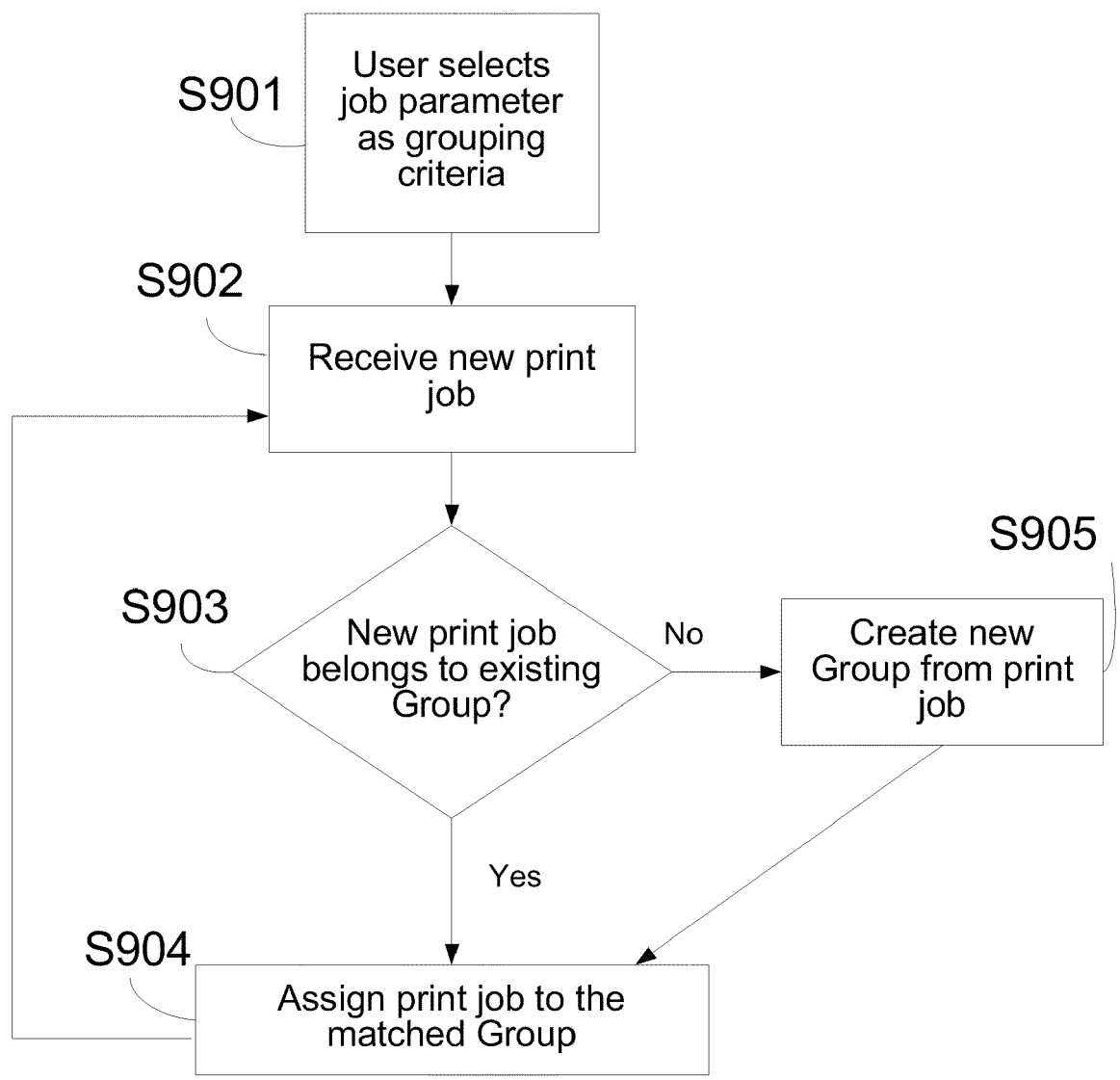
FIG. 9 is a flow chart illustrating a grouping method according to an embodiment of the present invention.

FIG. 9 illustrates an example of an algorithm that can be implemented on the server to perform this operation, according to an embodiment of the present invention. As shown in FIG. 9, a user first selects a particular job parameter (or job parameters) to define grouping criteria (S901). When a first print job arrives, the value of the selected job parameter is read out from the print job (Job Ticket) to define a first Group (S905) (assuming that there is no previously defined Group to put the first print job into) so that the first Group will receive all print jobs that have the same value as the first print job in the selected job parameter. The first print job is categorized into the first Group just created (S904). Thereafter, subsequent print jobs are analyzed to determine whether the print jobs belong to the first Group (S902, S903). All subsequent print jobs that have the same job parameter value as the first Group are placed in the first Group (S904). When a print job having a different value in the selected job parameter arrives, a new Group (second Group) is created based on the new value of the job parameter found in such a new print job (S905). Like operations continue to create the third, fourth, . . . Groups. Thus, once a job parameter (or job parameters) according to which the grouping operation is performed (S901) is selected, the grouping operation (steps S902-S905) can be performed without user intervention. Other appropriately designed comparison/grouping algorithms may also be used.

For example, the operator can choose the "Finishing" job parameter to define criteria for grouping print jobs. Suppose that first 10 incoming print jobs have only two differing values in Finishing: "left-side staple" (4 jobs) and "bare printing" (6 jobs). Then, when analysis of these first 10 print jobs is completed, two Groups corresponding to these two job finishing values are automatically created and these 10 print jobs are placed in the respective groups. If the 11th incoming job has a "right-side staple" value in the Finishing job parameter, then a new Group is created and the 11th job is placed in that Group. The similar operations continue until the operator interrupts it, or after a certain user-specified number of incoming jobs are processed, for example.

The name of the Groups that are created in this way can be set by using a certain predetermined rule, such as using the first three letters of the job parameter that defines the groups, followed by a numerical number, for example. In the above example, the names of the first and second Groups would be FIN1 and FIN2, and the name of the third Group would be FIN3. This way, the grouped print jobs are listed under the appropriately named group header in the In Box Panel on the screen.

In another embodiment, rather than serially processing the above grouping operation, a plurality of print jobs can be grouped at once in a similar manner. For example, after a certain number of print jobs comes in under the Incoming Jobs header in the In Box Panel and is piled up there, the operator may enter an automatic grouping command by selecting one or more of job parameters to prescribe the grouping criteria. In response, the server will process the print jobs from the top of the print jobs listing under the Incoming Jobs header using the process described above, so that all print jobs that are then listed under the Incoming Jobs header will be grouped in accordance with the selected job parameter (s).

The grouping operation can also be applied to a set of print jobs that are selectively picked up by an operator. For example, a user may select a certain set of print jobs by selectively highlighting print job entries in the In Box Panel, and then instruct the server to perform the above-described grouping operations.

During or after the grouping operation, an operator can open and monitor the contents of groups by reviewing the In Box Panel. As noted above, the operator can assign the print jobs that belong to a particular Group to a desired destination device, such as a Group, a Cluster or a Virtual Queue, for printing.

The server can be also configured so that once grouping is completed (or during the grouping process), all print jobs grouped into a particular Group are immediately submitted to a particular printer, a particular Cluster, or a particular Virtual Queue for printing without a delay (referred to as "Auto Printing Mode"). If coupled with the automatic grouping operations described above, grouping of print jobs and printer assignment and execution of printing can all be performed without user intervention. This mode is referred to as "Full Auto Mode." In the Full Auto Mode, the groups dynamically created as described above may only be transitory, and may be configured to disappear once print jobs in the respective group are submitted to printing devices for printing, for example.

Queues Panel

As described above, print jobs specify a variety of job parameters, such as color, paper type, paper size and finishing options. There is virtually an unlimited number of possibilities in job parameter settings of print jobs. However, due to limited functionalities of each printer, once set up in a certain way, even a very large print shop cannot handle every conceivable print job without altering the initial settings of some of the installed printers. The print jobs that cannot be handled without altering the existing printer settings are referred to as "non-standard print jobs" hereinafter. To name a few examples, even commercial grade high-end printers have a finite number of input paper trays, each containing paper of a particular size, such as letter size or legal size, and may not be equipped with sophisticated finishing functions that are required by certain jobs. Such printers cannot be used when a particular finishing option is specified. Thus, in order to meet today's customer needs, print shop operators must often change the settings of the existing printer(s), the paper size in a paper tray, etc., in order to process non-standard print jobs.

However, it is not always easy to find a printer whose settings are relatively easily changed. The operator can review the values of the job parameters set in the requested print job by selecting the job entry in the In Box Panel and by opening the Job Ticket screen. The operator can also review the printer settings of each of the printers (or virtual printing devices) by, for example, clicking on printer icons displayed in the Destination Panel. Then, theoretically, the operator can manually compare the values of job parameter set in the print job with the printer settings to find out a printer having the initial printer settings that are closest to the corresponding parameter values of the print job. However, when numerous printers (and virtual printing devices) are available for printing, this search is cumbersome and time-consuming.

Auto-printing operations discussed above will often leave print jobs that do not meet any of grouping criteria in the Incoming Jobs pane. In order to print these jobs, they must be manually assigned to a printer(s). Also, a user may elect to manually select a printer device even though automated grouping and printing options are possible. When numerous printers are available, manually locating the best or exact matching destination device (Printer, Cluster or Virtual Queue) is a difficult and time consuming task.

A print job management server according to embodiments of the present invention provides convenient features to assist users to find a printing device (a Printer, a Cluster or a Virtual Queue) that exactly or closely conforms to the job parameter values of a print job. In one embodiment, a print job management server compares the printer settings of each of the printers with the values of relevant job parameters of a print job, and if any of the printer settings in one printer matches the corresponding parameter value in the print job, that match is communicated to the user.

In a particular embodiment, the print job management server can launch a Queue Panel at request of a user. For example, when an operator selects a particular print job by clicking one of the print job entries in the In Box Panel, a Queue Panel window appears. The Queue Panel displays all Printers, Clusters and Virtual Queues that are connected or defined by the print job management server as available printing devices for printing jobs, and highlights the printer settings that match the corresponding job parameter values of the print job in question.

FIG. 10 illustrates an example of the Queue Panel for a specified print job. Referring to FIG. 10, the Queue Panel lists all available printers and software-defined virtual printing devices: Printers, Clusters, and Virtual Queues, together with the printer settings of Color, Paper Size, and Paper Type of each printer. If any of the printer settings of these parameters match a value(s) of the corresponding job parameter(s) specified in the print job, such a printer setting is highlighted in yellow. With this information, the user can narrow the search for the best printing device to process the print job. In the example of FIG. 10, the Queues Panel indicates that BW Printer 1 1050 has paper trays 1-3, respectively containing various sized paper of different types. As indicated in yellow, the Queues Panel shows that the Paper Size and Paper Type settings in Tray 2 of the printer match the Paper Size and Paper Type values of this particular print job. Similarly, other highlighted portions indicate that the printer settings match some of the job parameter values of this print job. The status of each printer, such as operating status, the number of spooled print jobs, and approximate waiting time, is also displayed in the corresponding header row to assist the operator, which is also convenient to a user. For example, if two Printers are found to have an exact match with respect to these three printer settings, the operator can select one of the Printers that has a less waiting time for printing.

Thus, the Queue Panel displays how each printing device conforms to the job parameter values required by a print job. Therefore, a user can easily and quickly locate a printing device to perform the requested print job or to find out which printer settings should be modified to perform the requested print job. In essence, the data in the Queue Panel provides the key data the operator needs to complete this otherwise time-consuming and difficult task.

When a printer that does not have a perfect match (meaning, say, there is no match in Paper Size) receives the print job, the print job management system can be configured such that the monitor at the selected printer will display a warning message indicating that the operator has to perform a certain manual task to complete the submitted print job. For example, when the operator at the server selects a printer that has a match only for the Color and Paper Type settings, an operator at the printer will be notified that the paper size of a certain input tray needs to be changed to a particular paper size to process the print job. Alternatively, before selecting such a non-matching printer as the job destination, the operator can change the paper size in advance so that the Queue Panel now displays a perfect match to that printer.

The Queue Panel of the above example also has the following advantage. As described above, a Cluster is a combination of two or more of the printers together with specified rules/algorithm to perform a print job. The Queue Panel visually provides a point-of-reference for the operator to see these linked printers to determine which features of these printers mach the requirements of the selected print job. This visual reference makes the Cluster feature easier to locate, identify and use. Moreover, even when a perfect match is not found with respect to a Cluster, the operator can easily identify what particular printer setting needs to be changed (or to be ignored) in order to cause a perfect match (or a quasi-perfect match) of the selected print job to the Cluster.

The printer settings that can be displayed in the Print Queues Panel are not limited to Color, Paper Size, and Paper Type. Depending on needs and the design of the print management system, other parameters, such as Finishing options, Layout Settings (e.g., double-sided or single-sided) may be listed in addition or in lieu of these parameters.

Thus, in order to help the operator determine a virtual or actual printing device for a print job, the Queue Panel lists destination devices (Printers, Clusters, and Virtual Queues) together with information on the printer status and information regarding matching of each printer setting with the specified printer job. This is useful and convenient especially where a large number of printers with various printer settings need to be managed by the print job management server.

In a preferred mode, as described above, the Queue Panel lists all connected printers and other virtual printing devices (Clusters and Virtual Queues). However, depending on the user preference, it may list only printers that have at least one setting that is found to match the job parameter value of the print job in question. This feature may be advantageous where the number of connected printers controlled by the server is very large and the Queues List would otherwise contain a long list of the printers and other virtual printing devices.

Printing Device (Printer/Cluster/Virtual Queue) Recommendation

As described above, the Queue Panel lists all the connected actual and virtual printing devices (Printers, Clusters, and Virtual Queues) together with information on the printer status and information regarding matching of each printer setting with the specified printer job. Based on the information displayed on the Queue Panel, the operator manually determines the best-matched and/or the second-best destination device(s). In another embodiment of the present invention, the print job management server can perform this determination in accordance with a user defined or preset criteria. This will further improve the ease and efficiency of print managing operations.

In one embodiment, given a print job, the print job management server of the present invention can recommend one or more printing devices (Printer, Cluster, or Virtual Queue) for that particular print job. By using an algorithm implemented by software, for example, the print job management server determines the suitableness of the printing devices for the print job. For example, the print job management server will first look for a printing device that supports the color of the document to be printed (i.e., the Color job parameter in the print job). Then, the print job management server will look for finishing option matches, and then will look for paper-related options, such as paper size and paper type, in order to progressively narrow the search for the best matching printing devices. The algorithm may be preset in the print job management software installed on the server, or it may be modified or altered by user inputs. For example, the server can be configured such that the operator can determine the priority in which the server considers these settings prior to making recommendations. Alternatively, or in addition, the operator can specify the algorithm itself to be used, such as which parameter should be used in what order in order to perform the recommendation operation.

In a particular embodiment, when the operator first selects a particular print job and selects the "View Recommends" option from the drop-down menu (or select View Recommends icon in the icon bar of the Main Screen), the server performs a searching operation in accordance with the above-described algorithm to determine a recommended printing device(s). Then, the server will launch a View Recommends Panel to visually indicate the recommended printing devices to the operator. In this example, although the arrangement of entries in the View Recommends Panel is similar to that of the Queues Panel, the View Recommends Panel lists only those printing devices (Printer, Cluster, or Virtual Queue) that are recommended by the print job management server.

As in the Queue Panel, a View Recommends Panel also lists the status of the printers listed therein. Based on the information displayed on the View Recommends Panel, the operator can readily decide what destination device to use for processing the print job. For example, if there are more than one exact matching printing devices, the operator may pick a device that has a shorter waiting time.

FIG. 11 illustrates an example of the View Recommends Panel. In FIG. 11, BW Printer 1 and BW Printer 2 appear in the View Recommends Panel, indicating that they are the recommended printing devices for Job Ticket #0003. As indicated by green-highlighted printer name and corresponding printer setting rows, these printers equally qualify, both having an exact match in the Paper Size, Paper Type and Color settings. However, the connection status of BW Printer 2 shows "Error," indicating that the printer needs to be serviced and is not available for immediate printing. Thus, the operator will likely choose BW Printer 1 for this print job.

FIG. 12 illustrates another example of the View Recommends Panel. Cluster 1 appears in the View Recommends Panel, indicating that Cluster 1 is the recommended printing device for Job Ticket #0001. As indicated in yellow highlighted printer name row, Color Printer 2 currently does not have printer settings that exactly match the corresponding job parameter values of the print job. In this example, the Paper Type job parameter mismatches. The operator needs to manually replace the paper content of Tray 2 of Color Printer 2, or if desired, can force the print job to be processed through Tray 2 to process this Job Ticket.

Because the server can determine printing devices that are suited to a given print job and the result is visually presented along with status information of each recommended printing device, an operator can easily identify the best printing device option for printing or for changing printer settings.

Selection Panel

In another embodiment, the above-described features of the Queue Panel and View Recommends Panel are combined so that all the information and functionalities discussed above with respect to these panels are accessible from a single, conveniently designed panel. In a particular embodiment, in place of the Queue Panel and View Recommends Panel, a View Selection panel is provided. When a user selects a print job in the In Box, and clicks on the "View Selection" button in the icon header row (or from the drop-down menu), a "Selection Panel" opens. A recommended printing device (or devices) appears in a manner similar to that discussed above. For example, a recommended printing device(s) is highlighted and expanded to show how printer settings match the job parameter values of the specified print job. A printing device(s) that has a perfect match with respect to all of the relevant printer settings may be highlighted in green and the corresponding tray may also be highlighted in green. The second best match that has a match in only some of the printer settings may be highlighted in yellow. Thus, as in the case above, the degree to which the printing devices match the print job can be indicated using different color.

All other non-recommended printing devices also appear in the Selection Panel. To save the space, printing devices that do not have a perfect match may be listed by presenting only their printing device names, for example. However, if desired, the operator can click on the printing device name to expand it, and review detailed printer settings of the selected printing device and how each of the printer settings matches the specified job parameter value. As in the case of Queue Panels discussed above, the individual printer settings that match the specified value of the print job parameter may be separately highlighted in yellow.

Figure 13:
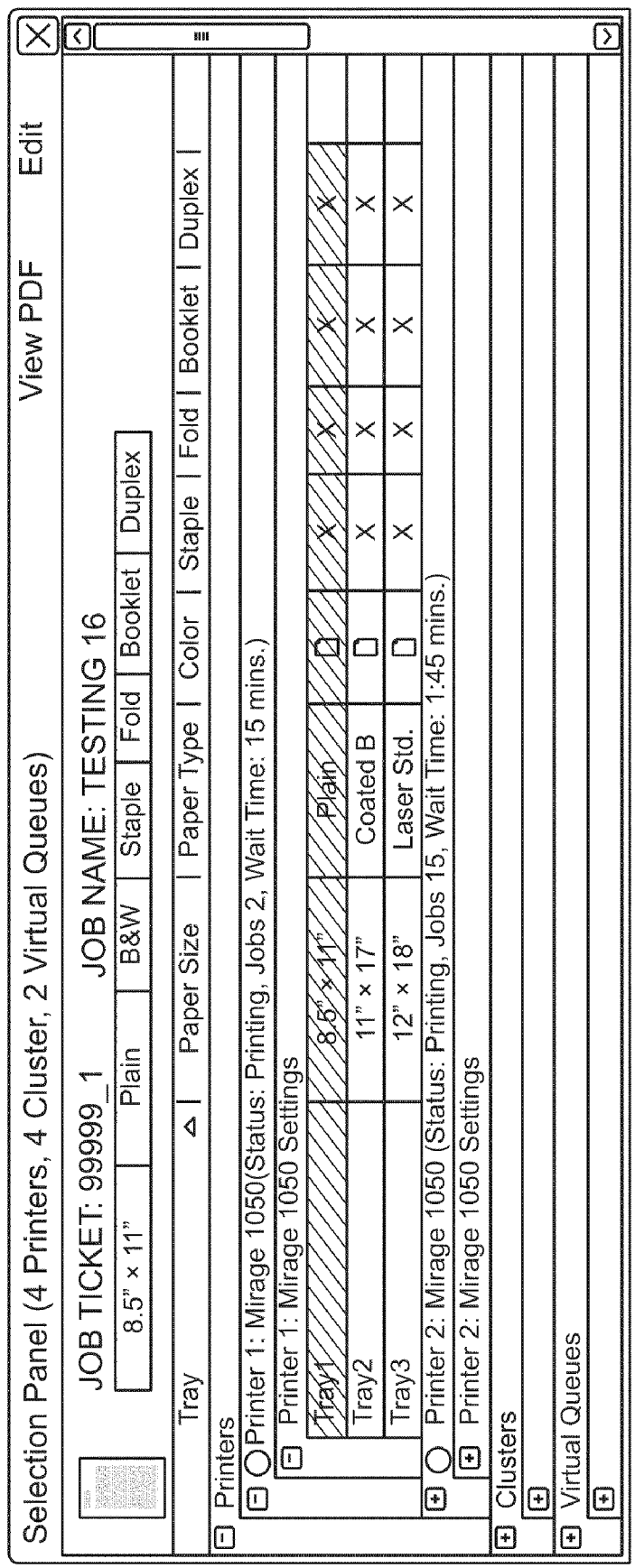
FIG. 13 schematically illustrates an example a Selection Panel according to an embodiment of the present invention.

FIG. 13 illustrates an example of the Selection Panel. At the top header row of the panel, the name of the panel, "Selection Panel" appears along with the number of Printers, Clusters, and Virtual Queues that are connected to the server. Just below the header row is shown information on the Job Ticket, indicating the job ticket number and the job name as well as the paper size, paper type, color and finishing options specified by the print job. As the print job parameters for the finishing options, this example designates Staple, Fold, Booklet and Duplex.

The rest of the panel is also designed in a manner similar to the Queue Panel and the View Recommends Panel discussed above. The panel lists printing devices (Printers, Clusters, Virtual Queues) along with their printer settings and indicates how these printer settings conform to the job parameter values specified in the print job. In the example of FIG. 13, each row of the paper tray indicates the paper size, the paper type, and the color of paper in the tray as well as information on whether paper fed from that paper tray can be processed by the following finishing options: Staple, Fold, Booklet, and Duplex. For example the "X" mark under Staple column indicates that the Staple finishing is available.

In this example, Printer 1 and its Tray 1 are highlighted in green, indicating that the printer settings perfectly match the print job requested. Indeed, it can be seen that the job parameter values of this print job, listed on the top of the Panel, match the respective printer settings listed for Tray 1 of Printer 1.

The size of the Selection Panel window is designed such that when the panel initially opens, the recommended printing devices are shown in the window. FIG. 13 shows the highlighted Printer 1 on the top, followed by Printer 2 and collapsed entries of Clusters and Virtual Queues. The Selection Panel of this example, however, contains all the printing devices (Printers, Clusters, Virtual Queues) connected to the server so that the status and other information, discussed with reference to Queue Panels above, of each of these devices are also accessible through this Panel by the user. By scrolling down the window and/or expanding the window, the user can access these printing devices and review the content.

The printing devices that do not qualify as recommended devices are collapsed to show only their names (or their type if there is no much in an entire type of printing devices) to save the space. In FIG. 13, there is no recommended printing device in Clusters and Virtual Queues. Therefore, only the names of the device type (Clusters and Virtual Queues) appear in the Selection Panel. If a user wishes to see the printer settings of these devices, the user can click on the device type name and then on a printing device name to expand the view.

As in the Queue and View Recommends Panels, the Selection Panel also lists the status of the printing devices. Based on the information displayed on the Selection Panel, a user can readily decide what printing device to use for processing the print job. For example, if there are more than one exact matching printing devices, the operator may pick a device that has a shorter waiting time. Further, using an appropriate algorithm, the server may be configured to refer to the status information of these printing devices and automatically determine the best matching printing device for presenting to the user.

In the above descriptions, the term "black and white" includes gray scales if the black and white printers are capable of printing gray scale images (e.g. using half-toning or some other suitable method).

While the embodiments have been described as being applied in a print shop environment, the invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet. Moreover, referring to FIG. 1, although the server 4 of the above examples functions as the print job management server as well as the network server, a separate stand-alone computer may be provided to run the print job management software. In the alternative, when properly configured, one of the client computers 1 and 2 or the computers attached to one of the printers 5-9 (if such a printer exists among them) may be used to assume the role of the print job management server. Further, although the above-referenced figures show particular designs of various windows, including the Main Screen, the In Box Panel, the Printer Jobs Panel, the Completed Jobs Panels, the Destination Panel, and the Information Panel, the present invention is not limited to the particular designs depicted in these figures and described above, and broadly encompasses various other designs that can perform the operations and functionalities described above. Furthermore, although a Windows based server computer with appropriate software has been described above as an example, a print management system of the present invention can be implemented in a proprietary hardware system that is specifically designed to perform the above-described various functionalities of the print management system.

It will be apparent to those skilled in the art that various modification and variations can be made in the print management method and apparatus of the present invention without departing from the spirit or scope of the invention. Thus, it is intended that the present invention cover modifications and variations that come within the scope of the appended claims and their equivalents.

What is claimed is:

1. A method for managing a plurality of pint jobs, implemented in a print job management apparatus connected to printers, the method comprising:
   receiving print jobs; and
   visually presenting a display screen to a user, the display screen including first, second and third panels for classifying the received print jobs according to processing phase thereof, the first panel being provided for listing print jobs that have not yet been assigned to any printer and are awaiting assignment of printers thereto for processing the print jobs, the second panel being provided for listing print jobs that have been assigned to printers and that have not been completed by the assigned printers, the third panel being provided for listing at least one of first and second categories of print jobs, the first category including print jobs that have been completed, the second category including print jobs that have been cancelled.

2. The method of claim 1, further comprising
   assigning one print job in the first panel to one or more of the printers; and
   refreshing the display screen to reflect the printer assignment of said one print job.

3. The method of claim 2, wherein the step of refreshing includes:
   removing an entry of said one print job from the first panel; and
   adding an entry representing said one print job to the second panel.

4. The method of claim 3, wherein the step of assigning assigns said one print job to two or more of the printers, and includes:
   splitting said one print job into a corresponding number of sub-print jobs, and
   assigning the sub-print jobs to the two or more of the printers, respectively, and
   wherein the step of adding includes adding entries of the sub-print jobs to the second panel.

5. The method of claim 2, further comprising:
   causing said one or more of the printers to process said one print job; and
   upon completion of said one print job by said one or more of the printers, refreshing the display screen to reflect the completion of said one print job.

6. The method of claim 2, wherein the step of assigning assigns said one print job to two or more of the printers, and includes:
   splitting the print job into a corresponding number of sub-print jobs and assigning the sub-print jobs to the two or more of the printers, respectively,
   wherein the step of refreshing the display screen to reflect the printer assignment includes removing an entry of said one print job from the first panel, and adding entries of sub-print jobs to the second panel, and
   wherein the method further comprises causing said two or more of the printers to process the sub-print jobs, respectively; and upon completion of said one print job by said two or more of the printers, removing the entry of said one print job from the second panel and adding an entry of said one print job to the third panel.

7. The method of claim 6,
   wherein upon completion of each sub-print job by the assigned printer, the corresponding entry of the sub-pint job is removed from the second panel and is added to the third panel, and
   wherein when all of the sub-print jobs are removed from the second panel and added to the third panel, said sub-print jobs are merged and appear as one entry in the third panel.

8. The method of claim 1, further comprising:
   receiving a command from a user to assign one print job to one or more of the printers;
   assigning said one print job to said one or more of the printers in accordance with the command received from the user; and
   refreshing the display screen to reflect the printer assignment of said one print job.

9. The method of claim 1, further comprising receiving a command from a user to selectively close one or more of the first, second and third panels.

10. The method of claim 1, further comprising receiving a command from a user to selectively open one or more of the first, second and third panels.

11. A non-transitory computer program product comprising a computer usable medium having a computer readable code embodied therein for controlling a data processing apparatus connected to printers, the data processing apparatus being further connected to a display monitor, the computer readable program code being configured to cause the data processing apparatus to execute a process for managing a plurality of print jobs, the process comprising: receiving print jobs; and causing a display monitor to visually present a display screen to a user, the display screen including first, second and third panels for classifying the received print jobs according to processing phase thereof, the first panel being provided for listing print jobs that have not yet been assigned to any printer and are awaiting assignment of printers thereto for processing the print jobs, the second panel being provided for listing print jobs that have been assigned to printers and that have not been completed by the assigned printers, the third panel being provided for listing at least one of first and second categories of print jobs, the first category including print jobs that have been completed, the second category including print jobs that have been cancelled.

12. A print management apparatus for managing a plurality of print jobs, comprising:

a display monitor; and a data processor for controlling the display monitor, the data processor being configured to receive print jobs, and causing the display monitor to visually present a display screen to a user, wherein the display screen includes first, second and third panels for classifying the received print jobs according to processing phase thereof, the first panel being provided for listing print jobs that have not yet been assigned to any printer and are awaiting assignment of printers thereto for processing the print jobs, the second panel being provided for listing print jobs that have been assigned to printers and that have not been completed by the assigned printers, the third panel being provided for listing at least one of first and second categories of print jobs, the first category including print jobs that have been completed, the second category including print jobs that have been cancelled.

* * * * *